(12) United States Patent
Lukashevich et al.

(10) Patent No.: US 9,083,582 B2
(45) Date of Patent: Jul. 14, 2015

(54) TRANSMITTER NOISE CANCELLATION IN A MULTI TRANSMITTER-RECEIVER SYSTEM

(71) Applicants: Dzianis Lukashevich, Munich (DE); Patrick Pratt, Mallow (IE)

(72) Inventors: Dzianis Lukashevich, Munich (DE); Patrick Pratt, Mallow (IE)

(73) Assignee: ANALOG DEVICES GLOBAL, Hamilton (BM)

( * ) Notice: Subject to any disclaimer, the term of this patent is extended or adjusted under 35 U.S.C. 154(b) by 0 days.

(21) Appl. No.: 14/168,881

(22) Filed: Jan. 30, 2014

(65) Prior Publication Data

US 2014/0269858 A1    Sep. 18, 2014

Related U.S. Application Data

(63) Continuation-in-part of application No. 13/801,130, filed on Mar. 13, 2013.

(51) Int. Cl.

| H03D 1/04 | (2006.01) |
| H03D 1/06 | (2006.01) |
| H03K 5/01 | (2006.01) |
| H03K 6/04 | (2006.01) |
| H04B 1/10 | (2006.01) |
| H04L 1/00 | (2006.01) |
| H04L 25/08 | (2006.01) |
| H04B 1/525 | (2015.01) |

(52) U.S. Cl.
CPC ............... *H04L 25/08* (2013.01); *H04B 1/525* (2013.01)

(58) Field of Classification Search
CPC . H04L 25/08; H04L 25/085; H04L 25/03343; H04L 25/497; H04L 25/03057; H04B 1/525; H04B 3/32; H04B 3/23

USPC ......... 375/346, 257, 350, 285, 284, 229, 232, 375/235, 219; 455/296, 63.1, 570
See application file for complete search history.

(56) References Cited

U.S. PATENT DOCUMENTS

| 5,848,097 A | 12/1998 | Carney et al. |
| 6,745,018 B1 | 6/2004 | Zehavi et al. |

(Continued)

FOREIGN PATENT DOCUMENTS

| JP | H07235894 A | 9/1995 |
| JP | 2009522908 A | 6/2009 |

(Continued)

OTHER PUBLICATIONS

European Search Report dated May 20, 2014, in European Application No. 14156668.7.

(Continued)

*Primary Examiner* — Phuong Phu
(74) *Attorney, Agent, or Firm* — Kenyon & Kenyon LLP

(57) ABSTRACT

In a multi transmitter-receiver system, transmitter noise cancellation may be applied selectively for certain transmitters by exploiting asymmetries of the system. Hence, observation receiver(s) numbering less than the number of transmitters may be provided saving space and cost. Each observation receiver may selectively couple to a transmitter path and estimate the leakage noise from that transmitter. Based on the estimated leakage noise, noise cancellation may be applied to corresponding receiver path(s). Selection of the transmitters for leakage estimation may be based on system conditions at that time, which may be known to the system or may be estimated dynamically.

18 Claims, 13 Drawing Sheets

(56) References Cited

U.S. PATENT DOCUMENTS

| | | | |
|---|---|---|---|
| 7,869,527 B2* | 1/2011 | Vetter et al. ............ | 375/259 |
| 8,103,235 B2* | 1/2012 | Shiotsu et al. ............ | 455/296 |
| 2002/0085647 A1 | 7/2002 | Oishi et al. | |
| 2002/0142725 A1 | 10/2002 | Clelland et al. | |
| 2004/0203458 A1 | 10/2004 | Nigra | |
| 2007/0184782 A1 | 8/2007 | Sahota et al. | |
| 2010/0159837 A1 | 6/2010 | Dent et al. | |
| 2010/0165895 A1 | 7/2010 | Elahi et al. | |
| 2011/0149714 A1 | 6/2011 | Rimini et al. | |
| 2011/0158346 A1 | 6/2011 | Ballantyne | |
| 2012/0295558 A1 | 11/2012 | Wang et al. | |
| 2013/0016798 A1 | 1/2013 | Velazquez et al. | |
| 2014/0194071 A1 | 7/2014 | Wyville | |

FOREIGN PATENT DOCUMENTS

| | | | |
|---|---|---|---|
| JP | 2009526442 A | 7/2009 | |
| JP | 2011509045 A | 3/2011 | |
| WO | 2007078032 A1 | 7/2007 | |
| WO | 2007092767 A1 | 8/2007 | |
| WO | 2009088787 A1 | 7/2009 | |
| WO | 2009090400 A1 | 7/2009 | |
| WO | 2009156510 A2 | 12/2009 | |
| WO | WO 2011/148341 A1 | 12/2011 | |

OTHER PUBLICATIONS

Partial European Search Report dated May 5, 2014, in European Application No. 14158027.4.

Rashid-Farrokhi et al., "Transmit Beamforming and Power Control for Cellular Wireless Systems," IEEE Journal on Selected Areas in Communications, vol. 16, No. 8, Oct. 1998, pp. 1437-1450.

Omer et al., "A PA-Noise Cancellation Technique for Next Generation Highly Integrated RF Front-Ends," 2012 IEEE Radio Frequency Integrated Circuits Symposium, pp. 471-474.

Amin et al., "Transmit and Receive Crosstalk Cancellation," 2010 6th International Conference on Emerging Technologies, IEEE, pp. 210-215.

Shynk, "Frequency-Domain and Multirate and Adaptive Filtering," IEEE Signal Processing Magazine, Jan. 1992, pp. 15-37.

Aparin et al., "Analysis and Reduction of Cross-Modulation Distortion in CDMA Receivers," IEEE Transactions on Microwave Theory and Techniques, vol. 51, No. 5, pp. 1591-1602, May 2003.

Bellanger et al., "TDM-FDM Transmultiplexer: Digital Polyphase and FFT," IEEE Transactions on Communications, vol. 22, No. 9, pp. 1199-1205, Sep. 1974.

Cruz et al., "Receiver Front-End Architectures—Analysis and Evaluation," Advanced Microwave and Millimeter Wave Technologies: Semiconductor Devices, Circuits and Systems, Mar. 2010, pp. 495-520.

Harris, F.J. et al., "Digital Receivers and Transmitters using Polyphase Filter Banks for Wireless Communications," IEEE Transactions on Microwave Theory and Techniques, vol. 51, No. 4, pp. 1395-1412, Apr. 2003.

Kim et al., "Implementation of a High-Throughput Low-Latency Polyphase Channelizer on GPUs," EURASIP Journal on Advances in Signal Processing, vol. 2014:141, Mar. 2014, pp. 1-10.

Navarro, A.P.et al., "Efficient Channelization for PMR+4G and GSM Re-Farming Base Stations," Signals and Systems Conference (ISSC 2012), IET Irish, Jun. 2012, pp. 1-6.

Navarro, A.P, "Channelization for Multi-Standard Software-Defined Radio Base Stations," A thesis presented to the National University of Ireland NUI Maynooth, Oct. 2010, 277 pages.

Araseki, T., "A Frequency Domain Adaptive Loop Canceller for Digital Terrestrial Broadcasting Systems", The Journal of the Institute of Image Information and Television Engineers, vol. 56, No. 8, pp. 1342-1348, Aug. 1, 2002, Japan.

European Search Report dated Apr. 24, 2015, in European Application No. 15151639.0.

\* cited by examiner

100

200

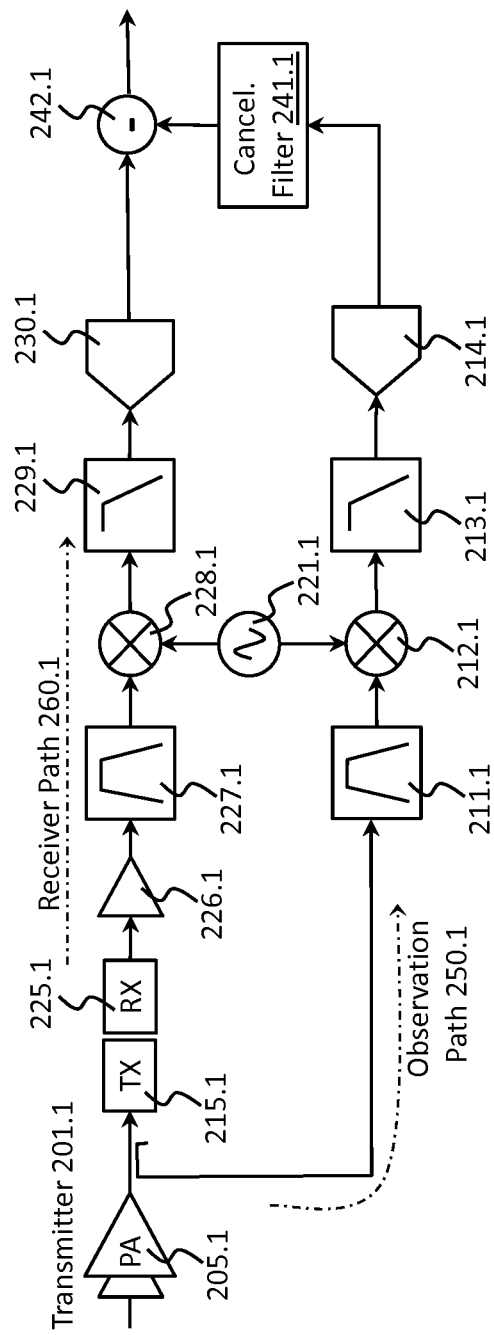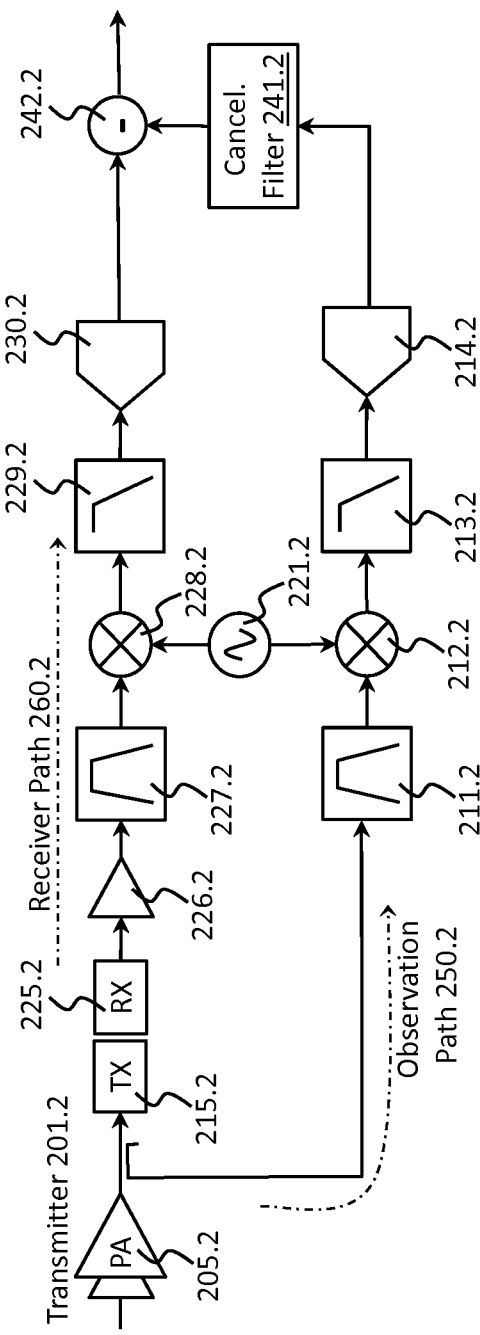
FIG. 2B
250

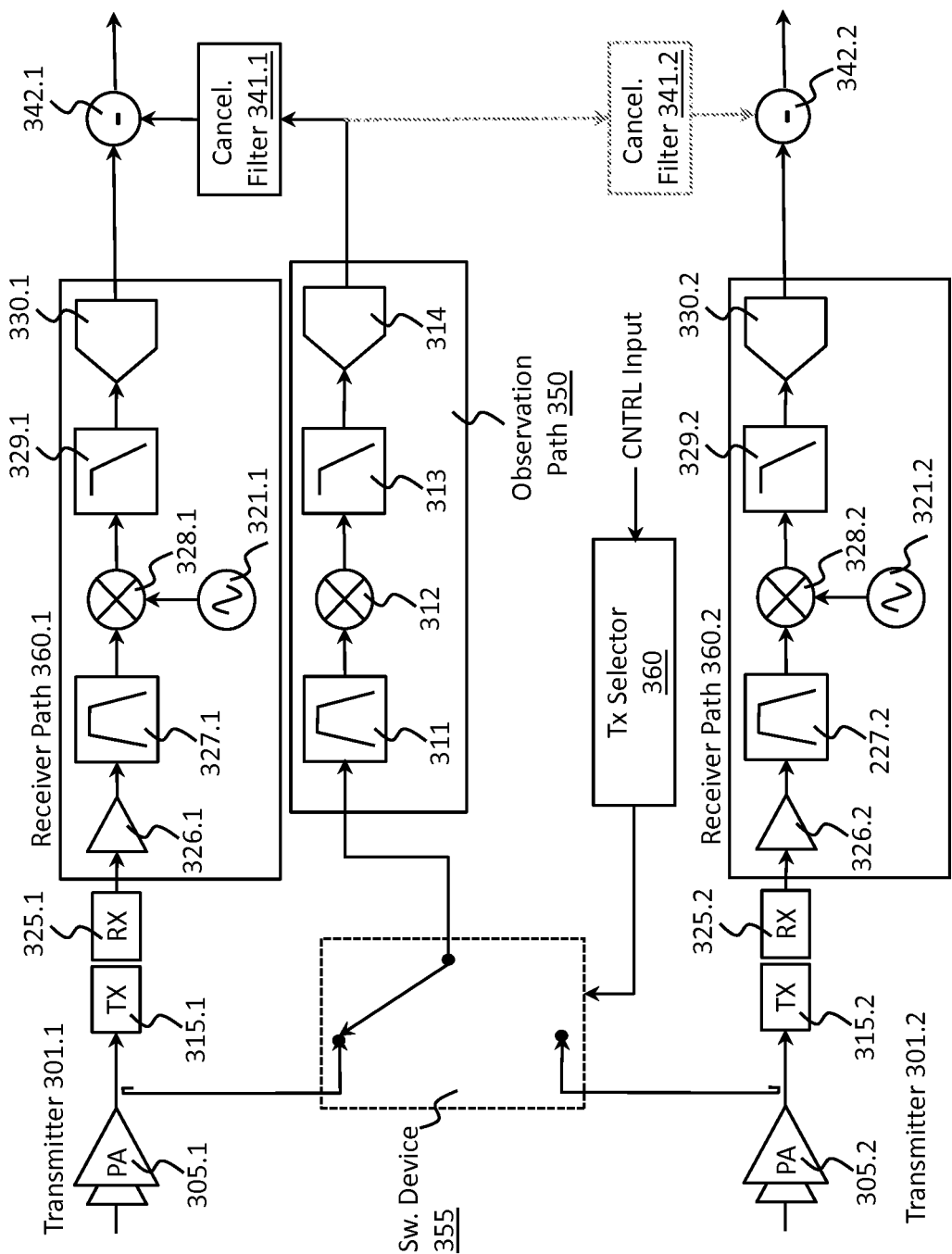

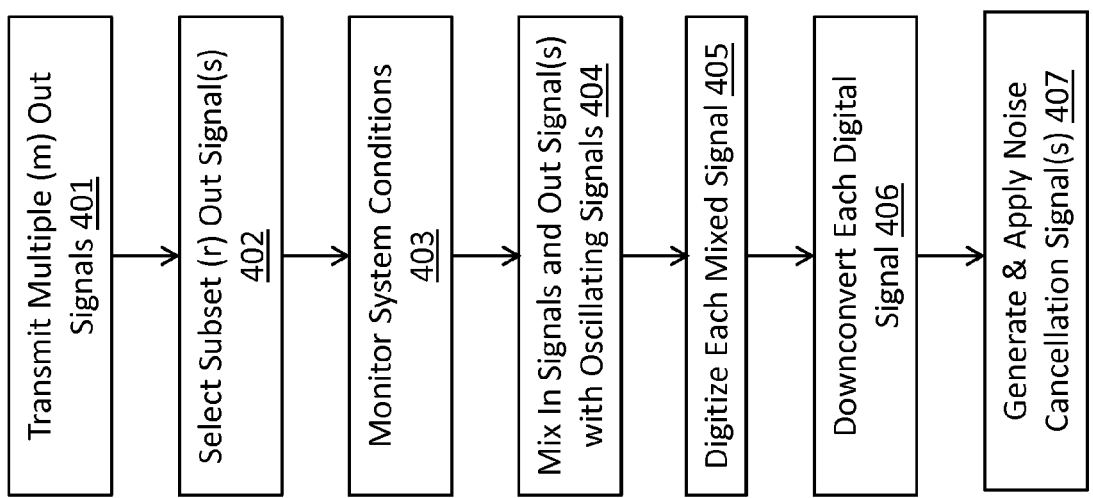

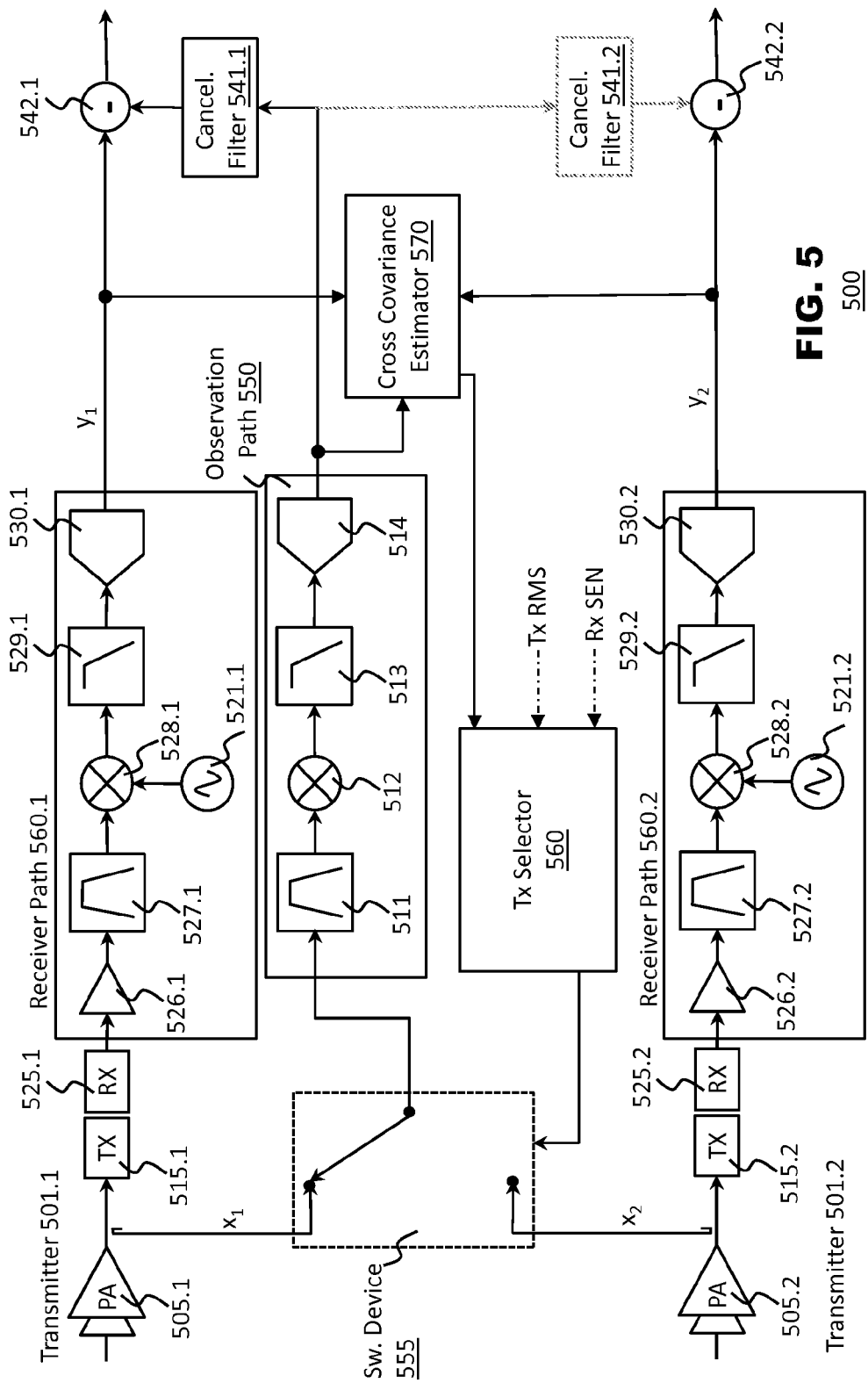

TRANSMITTER NOISE CANCELLATION IN A MULTI TRANSMITTER-RECEIVER SYSTEM

RELATED APPLICATIONS

This application is a continuation-in-part application of U.S. patent application Ser. No. 13/801,130 filed Mar. 13, 2013, entitled "Radio Frequency Transmitter Noise Cancellation," the content of which is incorporated herein in its entirety.

BACKGROUND

Radio frequency (RF) transmitter-receivers and transceivers have been capable of both transmitting and receiving RF signals. Typically, the transmit bands and the receive bands have been offset from each other to minimize interference at the receiver from the outgoing transmitter signals. Other interference reducing techniques, such as the use of special filters such as surface acoustic wave (SAW) filters have also been used to remove unwanted frequency components from the transmitted signals and reduce interference at the receiver.

Many transceivers today use digital predistortion techniques to generate more usable power from amplifiers, avoiding the need for larger amplifiers consuming more power. However, the use of these digital predistortion techniques caused additional transmitter noise to leak into the received signals at the receiver. The additional noise leakage has been reduced by increasing the size of the duplexer to achieve better isolation between transmit and receive bands. However, as wireless devices such as phones, tablets, and other RF devices become smaller and less expensive, these larger and more expensive duplexers have become impractical.

To reduce this additional transmitter noise, an estimate of the noise from the transmitted signals that is expected to leak can be generated. This estimate can then be used to reduce the additional transmitter noise. This process is sometimes called transmit noise cancellation. However, generating the estimate of leakage noise typically requires additional and redundant receiver circuitry. Moreover, to extend conventional transmit noise cancellation to multi transmitter-receiver systems, additional receiver circuitry will be needed for each transmitter-receiver pair. Again, as wireless devices become smaller and less expensive, the size cost of additional receiver circuitry can become impractical.

Therefore, there is a need for a transmit noise cancellation system that can be extended to multi transmitter-receiver systems without the extra cost of having additional receiver circuitry for each transmitter-receiver pair.

BRIEF DESCRIPTION OF THE DRAWINGS

FIG. 2B shows a circuit with multiple transmitter-receiver paths and transmit noise cancellation in an embodiment.

FIG. 3 shows a circuit with multiple transmitter-receiver paths and selective transmit noise cancellation in an embodiment.

FIG. 4 shows an exemplary method for transmit noise cancellation in an embodiment.

FIG. 5 shows a circuit with multiple transmitter-receiver paths and selective transmit noise cancellation in an embodiment.

DETAILED DESCRIPTION

Embodiments of the present invention may provide a system including a plurality of transmitter outputs and a plurality of receivers. The system may also include an observation receiver configured to be selectively coupled to one of the plurality of transmitter outputs and to estimate transmission noise from the coupled transmitter output. A cancellation filter, coupled to the observation receiver, may cancel the estimated transmission noise in at least one of the plurality of receiver paths.

Embodiments of the present invention may also provide a method comprising transmitting a plurality of RF outgoing signals; monitoring communication conditions; based on the monitored communication conditions, selecting a subset of the plurality of RF outgoing signals; converting incoming RF signals and the subset of the plurality of RF outgoing signals to digitized baseband signals; generating noise cancellation signal(s) based on the converted subset of the plurality of RF outgoing signals; and applying the noise cancellation signal(s) to certain converted incoming signal(s).

Embodiments of the present invention may further provide a circuit including an observation receiver, selectively coupled by a switching system, to one of a plurality of transmitter paths of multi transmitter-receiver system, the observation receiver including circuitry to convert the selected outgoing RF signal to a baseband digital signal. The circuit may also include a filter to generate a noise cancellation signal based on the baseband digital signal; and a combiner to apply the noise cancellation signal to a receiver path in the multi transmitter-receiver system.

Figure 1:
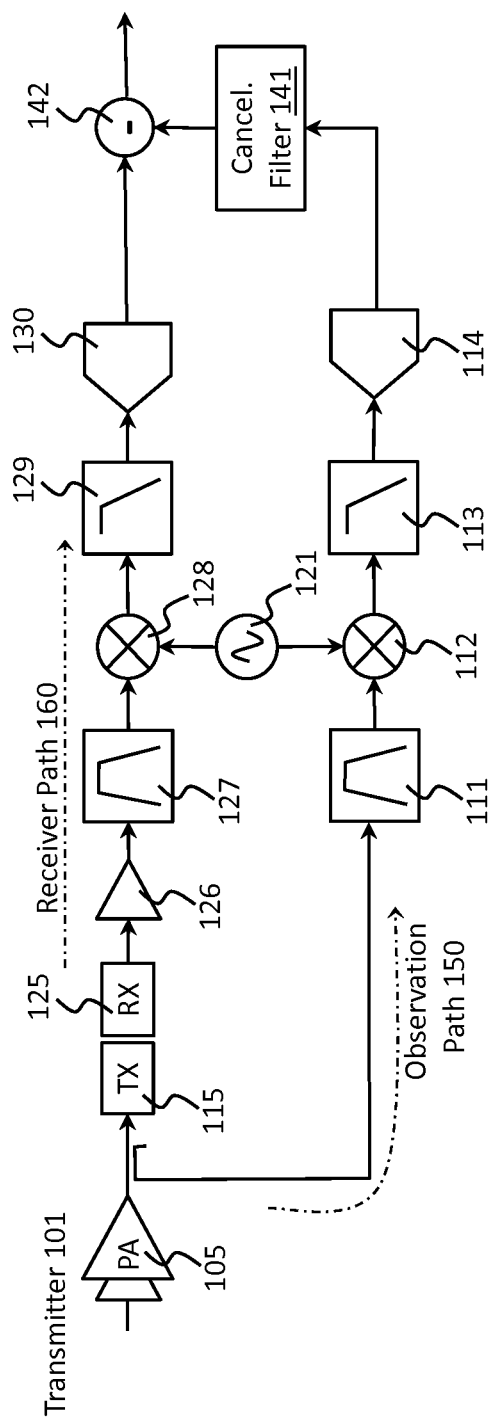
FIG. 1 shows a circuit with a single transmitter-receiver path in an embodiment.

FIG. 1 shows a circuit 100 according to an embodiment of the present invention. The circuit 100 may include transmitter path 101, a duplexer with a transmit section 115 and a receive section 125, a receiver path 160, an observation path 150, a cancellation filter 141, and a subtractor 142. The observation path 150 may estimate the leakage noise from the transmitter path 101, and corresponding transmit noise cancellation may be applied to the receiver path 160. The transmitter path 101 may include a RF power amplifier 105 that may amplify outgoing signals to drive an antenna (not shown) coupled to the transmitter section 115 that may transmit outgoing RF signals.

Incoming RF signals may be received and filtered by the receive section 125. The incoming RF signals may propagate down the receiver path 160, which may include an RF amplifier 126, a bandpass filter 127, a mixer 128, a low pass filter 129, and an analog-to-digital converter (ADC) 130. The incoming RF signals may be amplified by the RF amplifier 126 and filtered by the bandpass filter 127. The mixer 128 may mix the incoming RF signals with an oscillating signal from an oscillating source 121, such as a local oscillator. The incoming signal may then be filtered by the low pass filter 129, and the ADC 130 may convert the signal to a digital incoming signal. The digital incoming signal may be provided to the subtractor 142 as an input.

The outgoing RF signals from the transmitter path 101 may also be propagated along the observation path 150 from the output of the power amplifier 105 in addition to being transmitted. The observation path 150 may include circuits as in the receiver path, for example, a bandpass filter 111, a mixer 112, a low pass filter 113, and an ADC 114. The outgoing signals may be filtered by the bandpass filter 111. The mixer 112 may mix the outgoing RF signals with the oscillating signal from the oscillating source 121. The outgoing signal may be filtered by the low pass filter 113, and the ADC 114 may convert the signal to a digital outgoing signal. The digital outgoing signal may be provided to the cancellation filter 141.

The cancellation filter 141 may store filter coefficients representing characteristics of the estimated leakage noise transfer characteristics from the transmitter 101. Based on the digital outgoing signal, the cancellation filter 141 may estimate characteristics of the leakage noise transfer characteristic and may update its filter coefficients accordingly. The cancellation filter 141 may generate a noise cancellation signal to be provided to the subtractor 142. The subtractor 142 may subtract the noise cancellation signal from the digital incoming signal to reduce/cancel the transmitter noise.

Figure 2A:
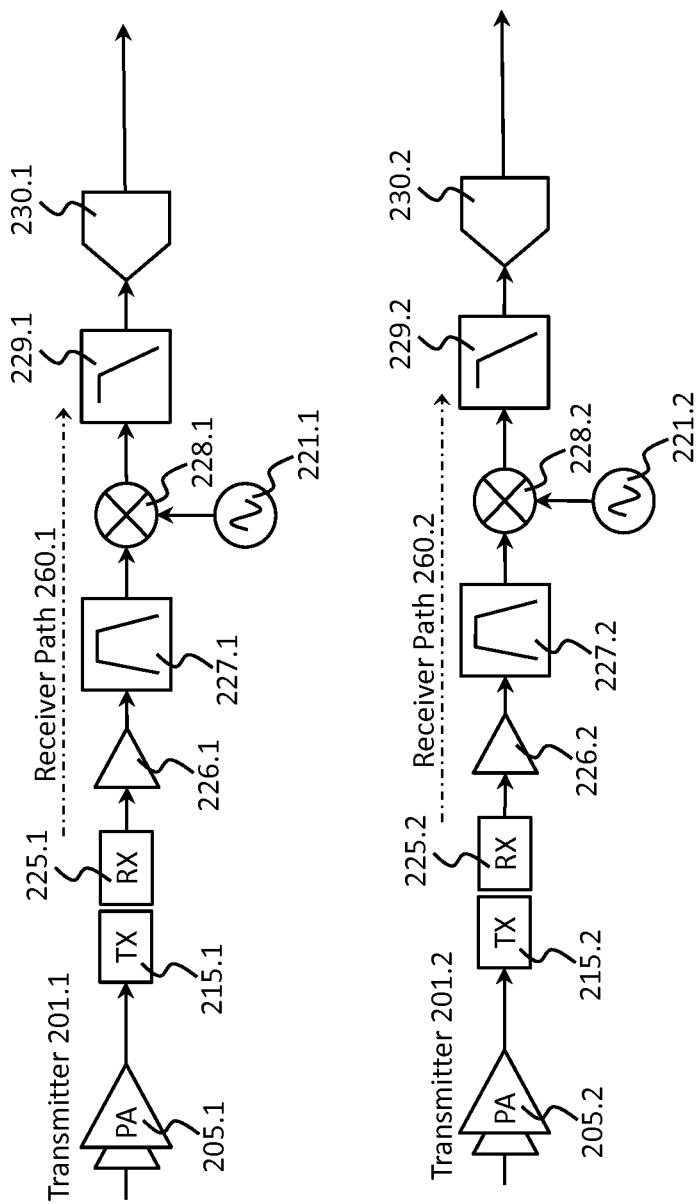
FIG. 2A shows a circuit with multiple transmitter-receiver paths in an embodiment.

Multi transmitter-receiver systems, such as Multiple Input Multiple Output (MIMO) and Adaptive Antenna Array (AAA), typically include multiple sets of transmitters and receivers. FIG. 2A shows a circuit 200 of a multi transmitter-receiver system with two transmitters and two receivers. The circuit 200 may include two sets each of transmitter paths 201.1/201.2, duplexers with transmit sections 215.1/215.2 and receive sections 225.1/225.2, and receiver paths 260.1/260.2.

The transmitter paths 201.1/201.2 may include RF power amplifier 205.1/205.2 that may amplify outgoing signals to drive antenna(s) (not shown) coupled to the transmitter sections 215.1/215.2 that may transmit outgoing RF signals.

Incoming RF signals may be received and filtered by the receive sections 225.1/225.2. The incoming RF signals may propagate down the receiver paths 260.1/260.2, which may include RF amplifier 226.1/226.2, bandpass filters 227.1/227.2, mixers 228.1/228.2, low pass filters 229.1/229.2, and ADCs 230.1/230.2. The incoming RF signals may be amplified by the RF amplifiers 226.1/226.2 and filtered by the bandpass filters 227.1/227.2. The mixers 228.1/228.2 may mix the incoming RF signals with an oscillating signal from oscillating sources 221.1/221.2. The incoming signals may be filtered by the low pass filters 229.1/229.2, and the ADCs 230.1/230.2 may convert the signals to digital incoming signals.

The circuit 200 is shown with two transmitters and receivers for illustrations purposes only, and a multi transmitter-receiver system may be implemented with any number (m) of transmitters and any number (n) of receivers. There may be a different number of transmitters than receivers (m≠n), or, alternatively, there may be a same number of transmitters and receivers (m=n).

To apply transmit noise cancellation in a multi transmitter-receiver system like circuit 200, an observation path (receiver) for each transmitter may be provided to sample each outgoing signal and generate a corresponding noise cancellation signal. Hence, if a system includes m transmitters, m observation paths may be included to estimate the transmit noise from each of the m transmitters for cancellation. FIG. 2B illustrates such an implementation with circuit 250 with two transmitters and two receivers. In addition to the two sets of transmitter 201.1/201.2 and receiver paths 260.1/260.2 described above, the circuit 250 may include two observation paths 250.1/250.2. Observation path 250.1 may be coupled to transmitter path 201.1, and observation path 250.2 may be coupled to transmitter path 201.2.

The outgoing RF signals transmitted by the transmitter paths 201.1/201.2 may also be propagated along respective observation paths 250.1/250.2 from the output of the power amplifiers 205.1/205.2 in addition to being transmitted. The observation paths 250.1/250.2 may include bandpass filters 211.1/211.2, mixers 212.1/212.2, low pass filters 213.1/213.2, and ADCs 214.1/214.2. The outgoing RF signals may be filtered by the bandpass filters 211.1/211.2. The mixers 212.1/212.2 may mix the outgoing signals with respective oscillating signals. The downconverted outgoing signals may be filtered by the low pass filters 213.1/213.2, and the ADCs 214.1/214.2 may convert the signals to digital outgoing signals. The digital outgoing signal may be provided to respective cancellation filters 241.1/241.2.

Based on the digital outgoing signals, each cancellation filter 241.1/241.2 may estimate the noise from its coupled respective transmitter and may update its filter coefficients accordingly. The cancellation filters 241.1/241.2 may generate noise cancellation signals to be provided to the subtractors 242.1/242.2. The subtractor 242.1/242.2 may subtract the noise cancellation signals from respective digital incoming signals to reduce/cancel transmitter noise.

Under this scheme, as the number of transmitters increase in a system, the number of observation receivers may also increase proportionally to maintain a 1:1 relationship between the transmitters and observation receivers. For example, if a system includes ten transmitters, then ten additional observation receivers may also be added to perform transmitter noise cancellation. This can increase the cost of implementing transmitter noise cancellation in multi transmitter-receiver systems.

FIG. 3 shows a circuit 300 according to an embodiment of the present invention. Similar to circuit 250 of FIG. 2B, circuit 300 may include two sets of transmitter paths 301.1/301.2, duplexers with transmit sections 315.1/315.2 and receive sections 325.1/325.2, and receiver paths 360.1/360.2. However, the circuit 300 may include a single observation path 350 that may be selectively coupled to one of the transmitter paths 301.1, 301.2 as described in further detail below.

The transmitter paths 301.1/301.2 may include RF power amplifier 305.1/305.2 that may amplify outgoing signals to drive antenna(s) (not shown) coupled to the transmitter sections 315.1/315.2 that may transmit outgoing RF signals.

Incoming RF signals may be received and filtered by the receive sections 325.1/325.2. The incoming RF signals may propagate down the receiver paths 360.1/360.2, which may include RF amplifier 326.1/326.2, bandpass filters 327.1/327.2, mixers 328.1/328.2, low pass filters 329.1/329.2, and ADCs 330.1/330.2. The incoming RF signals may be amplified by the RF amplifiers 326.1/326.2 and filtered by the bandpass filters 327.1/327.2. The mixers 328.1/328.2 may mix the incoming RF signals with an oscillating signal from oscillating sources 321.1/321.2. The incoming signals may be filtered by the low pass filters 329.1/329.2, and the ADCs 330.1/330.2 may convert the signals to digital incoming signals. The digital incoming signals may be provided to subtractors 342.1/342.2.

Circuit 300 also may include a switching device 355 that selectively couples one of the transmitter paths 305.1, 305.2 to the observation path 350 to estimate the noise from the selected transmitter. The outgoing RF signals of the coupled transmitter path may also be propagated along observation path 350 in addition to being transmitted. The observation path 350 may include a bandpass filter 311, a mixer 312, a low pass filter 313, and an ADC 314. The outgoing RF signals may be filtered by the bandpass filter 311. The mixer 312 may mix the outgoing RF signals with the oscillating signal from an oscillating source, which for example may be oscillating source 321.1 or oscillating source 321.2 depending on which transmitter is selectively coupled to the observation path 350 at the moment. For example, if transmitter path 301.1 is coupled by the switching device 355 to observation path 350, then oscillating source 321.1 may provide the oscillating signal. The outgoing signal may be filtered by the low pass filter 313, and the ADC 314 may convert the signal to a digital outgoing signal.

The digital outgoing signal may be provided to the cancellation filter 341.1. The cancellation filter 341.1 may store filter coefficients representing characteristics of the estimated leakage noise transfer characteristic from the selected transmitter 301.1. Based on the digital outgoing signal, the cancellation filter 341.1 may estimate the characteristics of the leakage noise and may update its filter coefficients accordingly. The cancellation filter 341.1 may generate a noise cancellation signal to be provided to the subtractor 342.1 in the first receiver path 341.1. The subtractor 342.1 may subtract the noise cancellation signal from the digital incoming signal to reduce/cancel the transmitter noise.

In an embodiment, the digital outgoing signal may also be provided to other cancellation filters for other receiver paths, such as cancellation filter 342.2 for the second receiver path 360.2. The cancellation filter 341.2 in the second receive path 360.2 may estimate the noise from the first transmitter 301.1 and may update its filter coefficients accordingly. The cancellation filter 342.2 may generate a noise cancellation signal to be provided to the subtractor 342.2 in the second receiver path 341.2. The subtractor 342.2 may subtract the noise cancellation signal from the digital incoming signal to reduce/cancel the transmitter noise from the first transmitter 301.1. In this embodiment, one observation path may provide a noise signal for more than one cancellation filter each cancelling noise for a different receiver.

The circuit 300 is shown with two transmitters and receivers for illustration purposes only, and a multi transmitter-receiver system may be implemented with any number (m) of transmitters and any number (n) of receivers. There may be a different number of transmitters than receivers (m≠n), or, alternatively, there may be a same number of transmitters and receivers (m=n). Also, the circuit 300 is shown with a single observation path for illustration purposes only, and a multi transmitter-receiver system may be implemented with any number (r) of observation receiver(s) that are less than the number of transmitters (i.e., r<m). For example, in a system with 10 transmitters, the number of observation receivers may range from 1-9.

The switching device 355 may selectively couple any transmitter (say, 301.1 or 301.2) to the observation path 350. The switching device 355 may be controlled by a transmitter selector 360. The transmitter selector 360 may operate the switching device 355 based on monitored system conditions (CNTRL Input).

The transmission selector 360 may exploit asymmetries in the multi transmitter-receiver system. For example, all transmitter-receiver paths may not benefit equally from transmit noise cancellation system at a given time. Some transmitter-receiver paths may be affected by transmit-noise leakage to a greater extent as compared to other transmitter-receiver paths. This asymmetry of leakage effect may also vary with time with the leakage effect on transmitter-receiver paths changing with time. Therefore, the transmitter selector 360 may select certain transmitter(s) to couple with observation path(s) for transmit noise cancellation, based on monitored system conditions at that time. For example, the transmitter selector 360 may exploit asymmetrical communication conditions LTE, WCDMA, and/or GSM systems, in particular in multi-mode, self-organizing MIMO radio systems.

The monitored system conditions may be known to the system or may be estimated dynamically. In an embodiment, the monitored system conditions may include transmitter power value, which may be quantified as Tx root mean square (RMS). The Tx RMS value may be known and/or set by the system, for example a baseband processor. In an embodiment, the transmitter(s) with the higher Tx RMS values may be coupled to observation path(s) for transmit noise cancellation because higher power values may correlate to more noise leakage.

In an embodiment, the monitored system conditions may include receiver sensitivity. Receiver sensitivity may be associated with the power level of the incoming signals and/or quality of service (QoS). Receiver sensitivity may be known by the system, for example the baseband processor. The receiver(s), for example, with the lower sensitivity values (e.g., lower incoming power) may benefit more from transmit noise cancellation because low power signals are more susceptible to noise corruption as noise can overpower a relatively low power signal. Thus, the corresponding transmitter pair(s) for the low sensitivity receiver(s) may be coupled to observation path(s). For example, in circuit 300, if the first receiver 360.1 has the lower sensitively, then its corresponding transmitter 301.1 may be coupled to the observation path 350.

In an embodiment, the monitored system conditions may include Tx–Rx leakage estimation. This estimation may be calculated using a normalized cross covariance technique described in further detail below. Furthermore, the monitored systems conditions may include any combination of factors that evaluate which transmitter(s) would benefit from transmit noise cancellation more than other transmitter(s).

FIG. 4 shows an exemplary process according to an embodiment of the present invention. In box 401, multiple (m) outgoing RF signals may be transmitted.

In box 402, system conditions may be monitored. The system conditions may include Tx RMS, receiver sensitivity, Tx–Rx leakage estimation, and/or other suitable factors that may evaluate the impact of noise leaking from the outgoing RF signals.

In box 403, a number (r) of outgoing signals may be selected for transmit noise cancellation, where r<m. For example, if there are 100 outgoing RF signals (m=100), then the selected number of outgoing signals may range from 1-99 (1<r≤99). The selection may be based on the monitored system conditions. In an embodiment, the selection may be performed periodically. In another embodiment, the selection may be synchronized with other system operations. For example, the selection may be synchronized with certain types of transmissions.

In box 404, incoming received RF signals and the selected r outgoing RF transmission signals may be mixed with respective oscillating signals.

In box 405, each of the mixed signals may be digitized.

In box 406, each of the digitized signals may be digitally down converted. Hence, the signals may be digitized baseband signals at this stage In box 407, noise cancellation signal(s) may be generated and each noise cancellation signal may be applied to at least one of the down converted incoming signals. For instance, coefficients of a cancellation filter may be updated based on a particular selected outgoing signal, and the cancellation filter may be applied to the incoming signal in the receiver whose transmitter pair generated that particular outgoing signal which was selected. In another embodiment, multiple cancellation filters may be updated based on the same outgoing signal estimation, and these multiple cancellation filters may apply noise cancellation signals to respective incoming signals.

FIG. 5 shows a circuit 500 according to an embodiment of the present invention. Similar to circuit 300 of FIG. 3, the circuit 500 may include two sets of transmitter paths 501.1/501.2, duplexers with transmit sections 515.1/515.2 and receive sections 525.1/325.2, and receiver paths 560.1/360.2. Also, circuit 500 may include an observation path 550 that may be selectively coupled to one of the transmitter paths 501.1, 501.2 by switching device 55 that is controlled by transmitter selector 560. The operations of the transmitter paths 501.1/502.2, receiver paths 560.1/560.2, and observation path 550 is described above with reference to FIG. 3.

The circuit 500 may also include a cross covariance estimator 570. The cross covariance estimator 500 may measure the leakage of a Tx channel into a Rx channel. The digitized signals from each of the receiver paths 560.1/560.2 and observation path(s) 550 may be provided as inputs to the cross covariance estimator 570, which may estimate the normalized cross covariance between the signals. For example, this cross covariance may be expressed as:

$$C_{xy}(i, j) = \frac{\sum x_i y_j}{\sum y_i y_j^*},$$

where x refers to outgoing signal(s) in the observation path(s) and y refers to incoming signals. This measurement may be performed periodically where different channels may be polled to determine the different levels of Tx–Rx leakage of the plurality of Tx–Rx paths. Alternatively, the measurement may be triggered by other operations in the system such as certain transmissions. A calculated value may be stored in a table for future reference. The cross covariance estimator 570 may provide its estimate to the transmitter selector 560.

Optionally, the transmitter selector 560 may receive other factors concerning system conditions. In an embodiment, the transmitter selector 560 may also receive Tx RMS and receiver sensitivity levels from the baseband processor, for example. Based on the information received, the transmitter selector 560 may control the switching device 555 to selectively couple any transmitter (say, 501.1 or 501.2) to the observation path 550 and provide transmit noise cancellation for that transmitter as described herein.

Though certain features of embodiments of the present invention may be shown in only certain figures, such features can be incorporated into other embodiments shown in other figures while remaining within the scope of the present invention. Different embodiments of noise cancellation techniques are described herein, and these may be considered individually or in combination with other aspects, embodiments, and variations of the present invention.

Noise cancellation may be applied in a variety of different manners and techniques. For example, noise cancellation may be applied on a channel by channel basis to a copy of an outgoing signal to be transmitted at the transmitter. The copy of the outgoing signal may be channelized and split up into separate channel components through a channelizing process. The digitized signals received at a receiver may also be channelized and split into separate signals on a channel by channel basis. A noise cancellation filter may be provided for each channel in a predetermined receive band. In some instances, one or more noise cancellation filters may be provided only for those active channel(s) within the predetermined receive band. In other instances the noise cancellation filter(s) may be provided for all channels, but only activated for active channel(s) within the receive band.

Applying noise cancellation on a per active channel basis instead of to the entire receive band may result in the removal of external blockers by an active channel filter before noise cancellation is applied. As a result, the adaptation rate of the channel specific noise cancellation filters need not be affected by external blockers and adaptation may occur at an original, uncompromised speed regardless of any external blockers.

Applying noise cancellation on a per active channel basis instead of to the entire receive band may also substantially reduce the filtering requirement and number of filter coefficients or taps of the noise cancellation filter. For example, full band filtering of Wideband Code Division Multiple Access (W-CDMA) signals may require the single filter to have at least several dozen if not one hundred or more taps more than each of individual channel filters when filtering is done on a channel by channel basis by, for example, splitting W-CDMA signals into 5 MHz channels and filtering only active channels. Since only the filters associated with active channels need to be powered, substantial power savings may be realized when filtering on an active channel basis.

A circuit in an embodiment may include a transmitter, a receiver, an analog to digital converter (ADC) coupled to the receiver, a channelizer coupled to the ADC, and a cancellation filter for each active channel of an incoming radio frequency signal received at the receiver. Each cancellation filter may be coupled to an output of the channelizer for the respective active channel. Each cancellation filter may be configured to estimate and cancel noise from the transmitter in each respective active incoming channel. In some instances the channelizer may include a digital downconverter (DDC), which may be implemented with digital mixers, or a polyphase and/or fast Fourier transform transmultiplexer such as an orthogonal frequency-division multiplexing (OFDM) transmultiplexer that extracts individual subcarriers in an OFDM receiver.

A mixer may be coupled between the receiver and the ADC. The mixer may mix the incoming radio frequency signal with an oscillating signal. A radio frequency amplifier and a band pass filter may be coupled between the receiver and the mixer. A low pass filter may be coupled between the mixer and the ADC.

Figure 6:
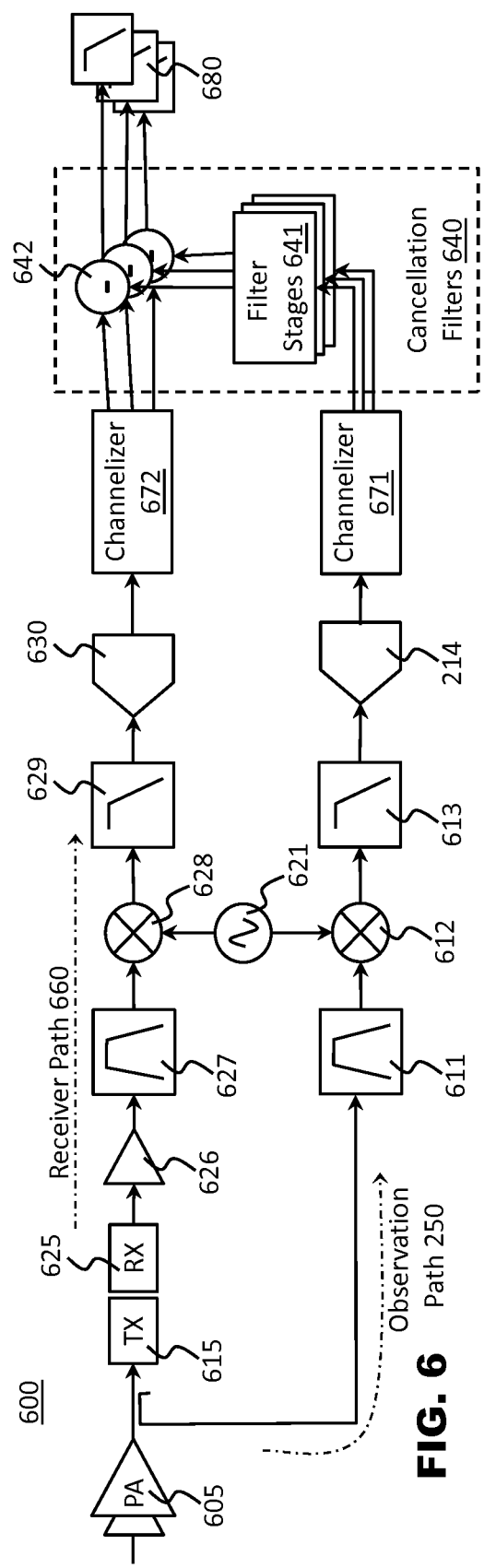
FIG. 6 shows an exemplary circuit in an embodiment.

FIG. 6 shows an exemplary circuit 600 in an embodiment. A transmitter 615 may transmit outgoing RF signals. A receiver 625 may receive incoming RF signals. The transmitter 615 may be coupled to a RF power amplifier 605 that may amplify outgoing signals to drive an antenna of the transmitter 615. A first ADC 630 may be coupled to the receiver 625 and a first channelizer 672. An incoming RF signal received at receiver 625 may propagate along a receiver signal path 660. A second ADC 614 may be coupled to the transmitter 615 and a second channelizer 671. An outgoing signal to be transmitted at transmitter 615 may be propagated along observation path 650 from the output of the power amplifier 605 in addition to being transmitted at transmitter 615.

Each channelizer 671 and 672 may channelize the signals outputted by the respective ADC 614 and 630. During the channelizing, the channelizers 671 and 672 may split the respective signals into separate channels on a channel by channel basis. Thus, in some instances, the channelizers 671 and 672 may include a separate output for each channel with an incoming RF signal band. In some instances, the channelizers may only output signals on a channel by channel basis for those channels that are active. The channelizers 671 and 672 need not generate output signals for inactive channels. In some instances, the channelizers 671 and 672 may include a DDC, a polyphase, a fast Fourier transform, and/or other type of transmultiplexer.

In some instances, a cancellation filter 640 may be provided for each of the channels within the incoming RF signal band. In other instances, a cancellation filter 640 may only be provided for only those active channel(s) within the signal band. Each cancellation filter 640 may be coupled to an output of the first and second channelizers 672 and 671 for the respective channel. Each cancellation filter 640 may be configured to estimate and cancel noise from the transmitter 615 in each respective active incoming channel.

Each cancellation filter 640 may include a filter stage 641 coupled to a subtractor 642. The subtractor 642 for the cancellation filter 640 in each active channel may be coupled to a respective channel output of the first channelizer 672. The filter stage 641 for the cancellation filter 640 in each active channel may be coupled to a respective channel output of the second channelizer 671. A common channel filter 680 may be provided for each active channel and coupled to an output of the subtractor 642 for the respective active channel.

In some instances, a first mixer 628 may be coupled to the receiver 625 and the first ADC 630. The first mixer may mix the incoming radio frequency signal with an oscillating signal from an oscillating source 621. A second mixer 612 may be coupled to the transmitter 615 and the second ADC 614. The second mixer 612 may mix the outgoing signal with the oscillating signal from the oscillating source 621. A radio frequency amplifier 626 and a first band pass filter 627 may be coupled between the receiver 625 and the first mixer 628. A second band pass filter 611 coupled to the transmitter 615 and the second mixer 612. A first low pass filter 629 may be coupled to the first mixer 628 and the first ADC 230. A second low pass filter 613 may be coupled to the second mixer 612 and the second ADC 614.

Figure 7:
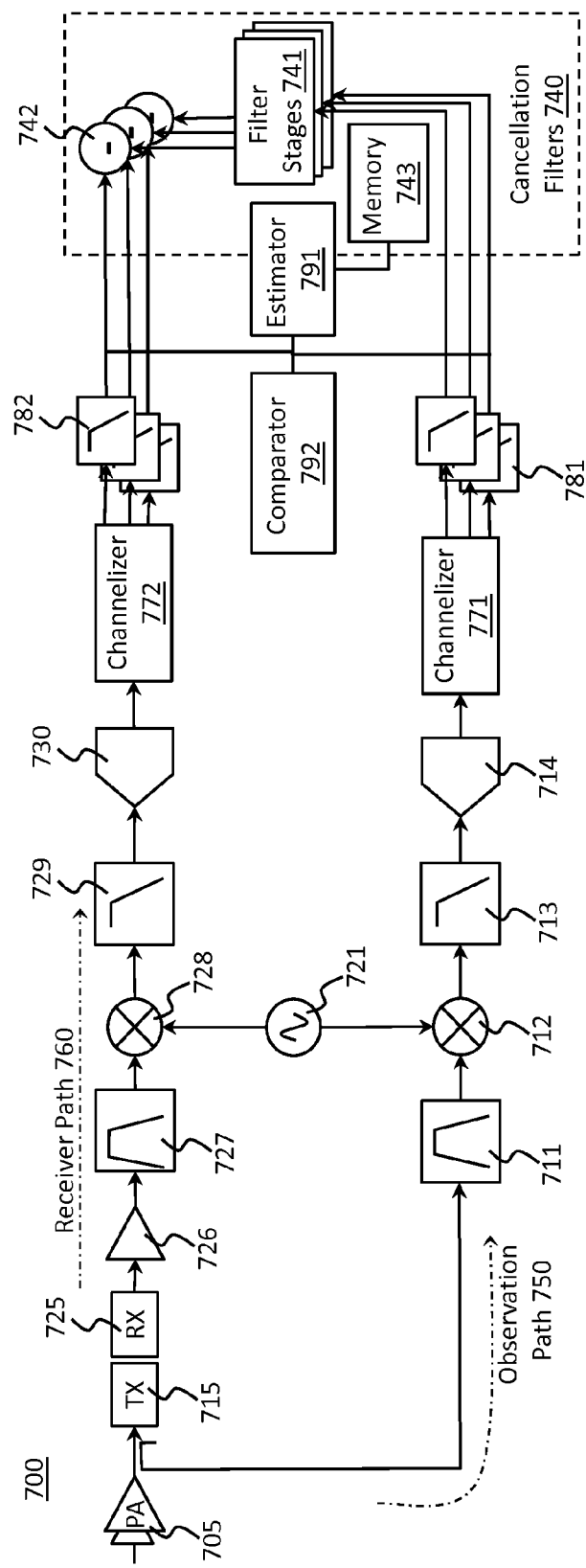
FIG. 7 shows an exemplary circuit in an embodiment.

FIG. 7 shows an embodiment 700 in which channel filtering is provided on both the receiver signal path 760 and the observation signal path 750. A transmitter 715 may transmit outgoing RF signals. A receiver 725 may receive incoming RF signals. The transmitter 715 may be coupled to a RF power amplifier 705 that may amplify outgoing signals to drive an antenna of the transmitter 715. A first ADC 730 may be coupled to the receiver 725 and a first channelizer 772. An incoming RF signal received at receiver 725 may propagate along a receiver signal path 760. A second ADC 714 may be coupled to the transmitter 715 and a second channelizer 771. An outgoing signal to be transmitted at transmitter 715 may be propagated along observation path 750 from the output of the power amplifier 705 in addition to being transmitted at transmitted at transmitter 715.

Each channelizer 771 and 772 may channelize the signals outputted by the respective ADC 714 and 730. During the channelizing, the channelizers 771 and 772 may split the respective signals into separate channels on a channel by channel basis. Thus, in some instances, the channelizers 771 and 727 may include a separate output for each channel with an incoming RF signal band. In some instances, the channelizers may only output signals on a channel by channel basis for those channels that are active. The channelizers 771 and 772 need not generate output signals for inactive channels. In some instances, the channelizers 771 and 772 may include a DDC, a polyphase, a fast Fourier transform, and/or other type of transmultiplexer.

In some instances, a cancellation filter 740 may be provided for each of the channels within the incoming RF signal band. In other instances, a cancellation filter 740 may only be provided for only those active channel(s) within the signal band. Each cancellation filter 740 may include a filter stage 741 coupled to a subtractor 742.

Channel filters 781 and 782 may also be provided for the different channels in both the receiver signal path 760 and the observation signal path 750. Each channel filter in a first set of channel filters 782 may be coupled to a respective channel output of the first channelizer 772 and to a respective filter stage 741 of the cancellation filter 740 associated with the respective channel. Each channel filter in a second set of channel filters 781 may be coupled to a respective channel output of the second channelizer 771 and to a respective subtractor 742 of the cancellation filter 740 for the respective channel. Each cancellation filter 740 may be configured to estimate and cancel the channel filtered noise from the transmitter 715 in each respective active incoming channel.

In some instances, a first mixer 728 may be coupled to the receiver 725 and the first ADC 730. The first mixer may mix the incoming radio frequency signal with an oscillating signal from an oscillating source 721. A second mixer 712 may be coupled to the transmitter 715 and the second ADC 714. The second mixer 712 may mix the outgoing signal with the oscillating signal from the oscillating source 721. A radio frequency amplifier 726 and a first band pass filter 727 may be coupled between the receiver 725 and the first mixer 728. A second band pass filter 711 coupled to the transmitter 715 and the second mixer 712. A first low pass filter 729 may be coupled to the first mixer 728 and the first ADC 730. A second low pass filter 713 may be coupled to the second mixer 712 and the second ADC 714.

In some instances, an estimator 791 may be coupled to the outputs of the channel filters 781 and 782. The estimator 791 may be configured to estimate new filter coefficients on one or more of the channels based on the filtered signals from the channel filters 781 and 782 on the respective channel(s). The estimator 791 may use an estimation algorithm, such as a minimum mean square, least squares, recursive least squares, least mean squares, or other algorithm to estimate these filter coefficients. The filter coefficients may be estimated periodically at predetermined intervals or at other predetermined events, such as when the receiver and/or transmitter are offline, just starting up, or at other times. The estimator 791 may generate updated filter coefficients for a filter in the filter stage 741 of a respective active channel based on the coefficient estimates for the respective active channel. Each filter stage 741 may have an asymmetric frequency response and complex filter coefficients since the outputs from channelizer 771 may be complex valued.

In some instances, a comparator 792 may be coupled to the estimator 791. The comparator 792 may include logic for comparing a root mean square (RMS) power of the outgoing signal on the observation signal path 750 and the incoming signal on the receiver signal path 760. In some instances the comparator 792 may compare the power of incoming signal on the receiver signal path 760 to a predetermined maximum value or to the corresponding power of the outgoing signal. The comparator 792 may also include logic for activating the minimum mean square filter coefficient estimator 791 when the power of the incoming signal is less than the predetermined maximum value or when a difference of the compared power values of the incoming and outgoing signals exceeds a threshold. The activation of the estimator 791 by the comparator 792 may trigger the estimator 791 to generate updated filter coefficients for the filter stage 741 of at least one of the channels. The cancellation filters 740 may include a memory 743 storing filter coefficients and the updated filter coefficients for the filters in the filter stages 741.

Figure 8:
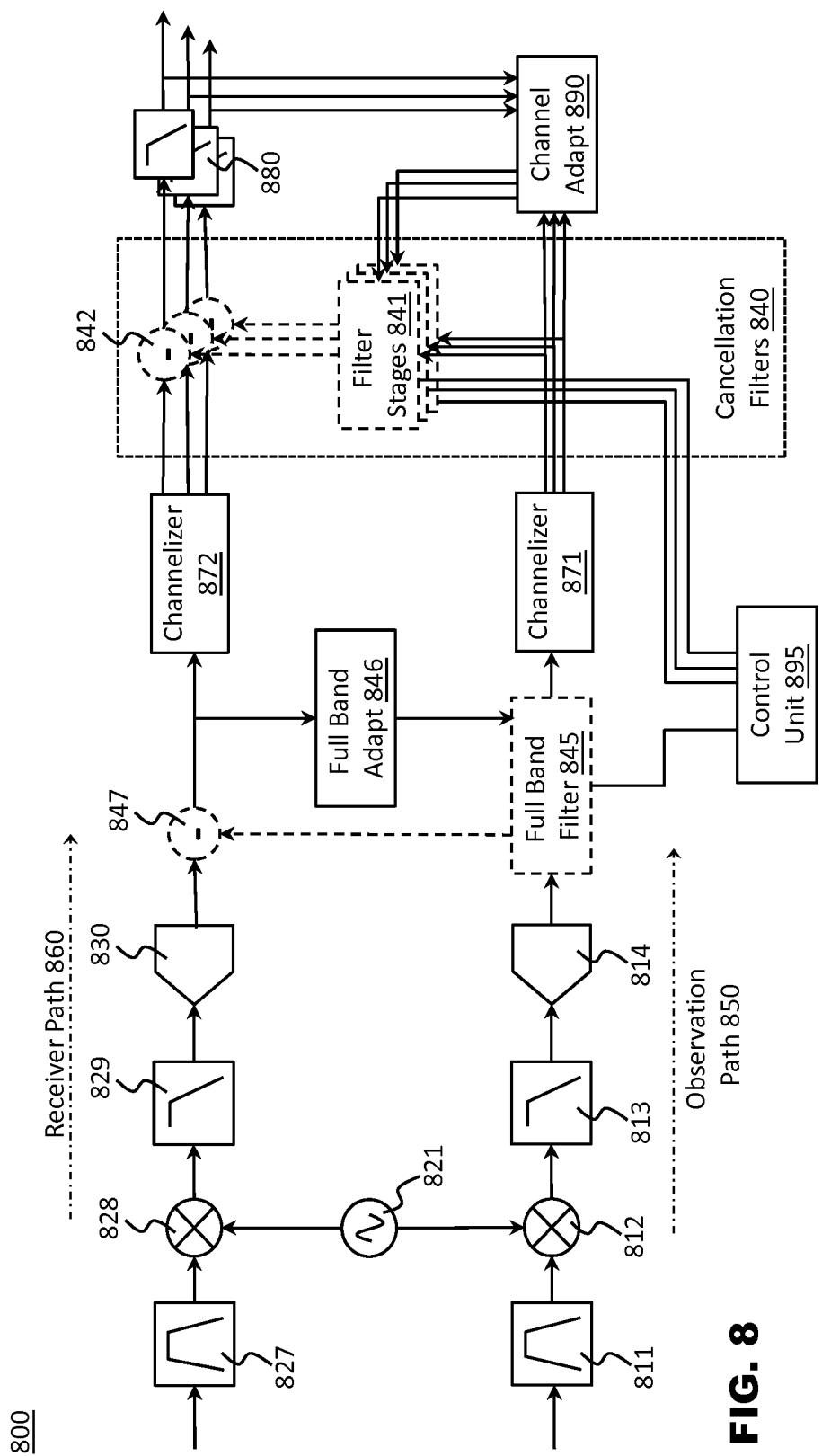
FIG. 8 shows an exemplary circuit in an embodiment.

FIG. 8 shows an exemplary hybrid circuit 800 in an embodiment. A first ADC 830 may be coupled to a receiver (not shown) as in the other figures and a first channelizer 872. An incoming RF signal received at the receiver may propagate along a receiver signal path 860. A second ADC 814 may be coupled to a transmitter (not shown) as in the other figures and a second channelizer 871. An outgoing signal to be transmitted may be propagated along observation path 850 in addition to being transmitted.

Each channelizer 871 and 872 may down convert and/or channelize the signals outputted by the respective ADC 814 and 830. During the channelizing, the channelizers 871 and 872 may split the respective signals into separate channels on a channel by channel basis. Thus, in some instances, the channelizers 871 and 872 may include a separate output for each channel with an incoming RF signal band. In some instances, the channelizers may only output signals on a channel by channel basis for those channels that are active. The channelizers 871 and 872 need not generate output signals for inactive channels. In some instances, the channelizers 871 and 872 may include a DDC, a polyphase, a fast Fourier transform, and/or other type of transmultiplexer.

Two types of cancellation filters 845 and 840 may be provided. A full band cancellation filter 845 may be coupled to the second ADC 814, the second channelizer 871, and a subtractor 847. The subtractor 847 may also be coupled to the first ADC 830 and the first channelizer 871. A full band filter adaptation unit 846, which may include an estimator such as estimator 791, may be used to calculate updated filter coefficients for the full band cancellation filter 845. The full band filter adaptation unit 846 may also be coupled to the receiver signal path 860, in some instances between the subtractor 847 and first channelizer 872.

Channel specific cancellation filters 840 may be provided for each of the channels within the incoming RF signal band. In other instances, channel specific cancellation filters 840 may only be provided for only those active channel(s) within the signal band. Each cancellation filter 440 may be coupled to an output of the first and second channelizers 872 and 871 for the respective channel. Each cancellation filter 840 may be configured to estimate and cancel transmitter noise in each respective active incoming channel.

Each cancellation filter 840 may include a filter stage 841 coupled to a subtractor 842. The subtractor 842 for the cancellation filter 480 in each active channel may be coupled to a respective channel output of the first channelizer 872. The filter stage 841 for the cancellation filter 840 in each active channel may be coupled to a respective channel output of the second channelizer 871. A common filter 880 may be provided for each active channel and coupled to an output of the subtractor 842 for the respective active channel.

A channel filter adaptation unit 890 may be coupled to each channel output of the second channelizer 871, each filter stage 841, and the subtractor 842 and/or common filter 880 for each channel. The channel filter adaptation unit 890 may include an estimator 791 and/or comparator 792 providing the same functionality discussed previously. The full band and channel cancellation filters 845 and 840 may include a memory storing filter coefficients and the updated filter coefficients for the filters 845 and 840.

The full band and channel cancellation filters 845 and 840 may be coupled to a control unit 895 configured to selectively enable and disable each of the filters 845 and 840 to provide the option of using only the full band filter 845, only the channel filter 840, or both filters 845 and 840. The control unit 895 may be configured to select the full band filter 845 in situations where active channels may be concentrated over one contiguous region of the signal band or where signal isolation characteristics do not require complex filtering requiring a large number of filter coefficients to isolate transmitter noise.

The control unit 895 may be configured to select channel filters 840 in situations where the active channels are discontiguously spread across the signal band and located in regions requiring a large number of filter coefficients to isolate transmitter noise. Configuring the control unit 895 to toggle between the channel filters 840 and full band filter 845 may result in improved performance in situations where the low order full band filter 845 is used in low complexity regions discussed above and the channelized filters 840 are only applied to active channels of high complexity.

The filter coefficients of the full band filter 845 and the channel filters 840 may be updated by their respective adaptation units 846 and 890. The coefficient updating processes in these adaptation units 846 and 890 may be performed at different intervals. For example, the filter coefficients of the full band filter 845 may only be configured once in some instances, but the filter coefficients of the channel filters 840 may be configured each time the circuit 800 is powered up or on another periodic basis, such as in one non-limiting example, when the main power level of the received incoming signal is low enough or satisfies some other criteria.

In some instances, a first mixer 828 may be coupled to the receiver and the first ADC 830. The first mixer 828 may mix the incoming radio frequency signal with an oscillating signal from an oscillating source 821. A second mixer 812 may be coupled to the transmitter and the second ADC 814. The second mixer 812 may mix the outgoing signal with the oscillating signal from the oscillating source 821. A radio frequency amplifier 826 and a first band pass filter 827 may be coupled between the receiver and the first mixer 428. A second band pass filter 811 coupled to the transmitter 815 and the second mixer 812. A first low pass filter 829 may be coupled to the first mixer 828 and the first ADC 830. A second low pass filter 813 may be coupled to the second mixer 812 and the second ADC 814.

Figure 9:
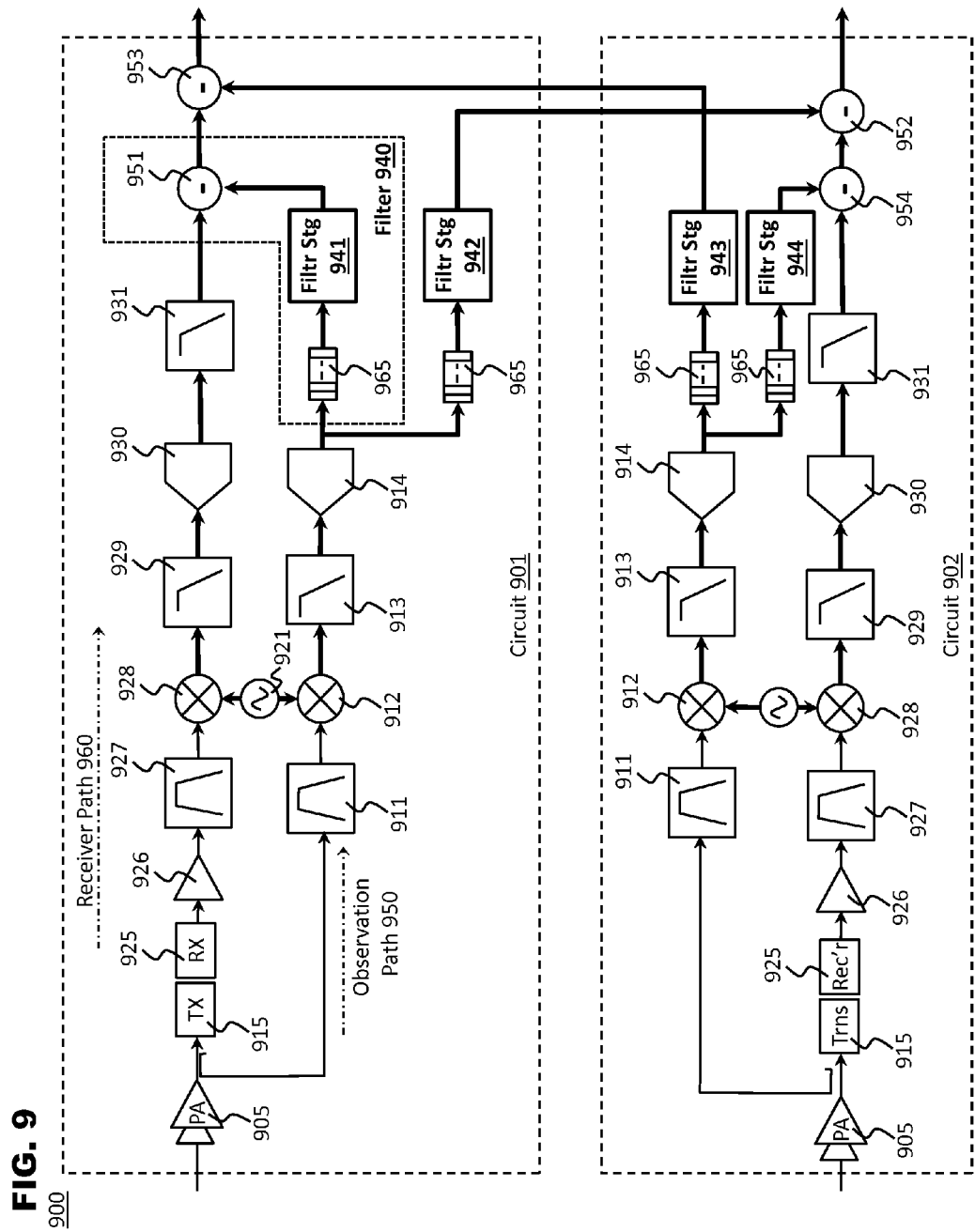
FIG. 9 shows an exemplary circuit in an embodiment.

FIG. 9 shows a multi transmitter-receiver cross coupled noise cancellation circuit in an embodiment. In this example, only two transmitter-receiver pairs are shown in respective cross coupled circuits 901 and 902, but other embodiments may include additional transmitters and/or receivers. Circuits 901 and 902 may each include similar components.

For example, each circuit 901 and 902 may include a transmitter 915 transmitting outgoing RF signals, and a receiver 925 receiving incoming RF signals. Each transmitter 915 may be coupled to a RF power amplifier 905 that may amplify outgoing signals to drive an antenna of the transmitter 915. Each circuit 901 and 902 may include a first ADC 930 coupled to its receiver 925. An incoming RF signal received at each receiver 925 may propagate along each respective receiver signal path 960. Each circuit 901 and 902 may include a second ADC 914 coupled to its respective transmitter 915. An outgoing signal to be transmitted at each transmitter 915 may be propagated along a respective observation path 950 from the output of the power amplifier 905 in addition to being transmitted at transmitted at its respective transmitter 915.

In some instances, each circuit 901 and 902 may include a cancellation filter stage 941 to 944 for each of the receivers included in the embodiment. For example, since FIG. 9 includes two receivers, each of the transmitters 915 may have two cancellation filter stages 941-942 and 943-944. In other instances with different numbers of receivers, the number of filter stages would be adjusted accordingly. Each of the filter stages 941 to 944 may also be coupled to a respective subtractor 951 to 954 and its corresponding second ADC 914.

Each of the filter stages 941 to 944 may be configured to estimate and cancel transmitter noise between the transmitter 515 that the filter stage 941 to 944 is coupled to and a respective one of the incoming signals received at each receiver 925. Thus, filter stage 941 and its subtractor 951 may be configured to reduce transmitter noise from transmitter 915 in circuit 901 from the incoming signal received at receiver 925 of circuit 901. Filter stage 942 and its subtractor 952 may be configured to reduce transmitter noise from transmitter 915 in circuit 901 from the incoming signal received at receiver 925 of circuit 902. Filter stage 943 and its subtractor 953 may be configured to reduce transmitter noise from transmitter 915 in circuit 902 from the incoming signal received at receiver 925 of circuit 901. Filter stage 944 and its subtractor 954 may be configured to reduce transmitter noise from transmitter 915 in circuit 902 from the incoming signal received at receiver 925 of circuit 902.

A low pass filter 931 in circuit 901 may be coupled to the ADC 930 of circuit 901 and subtractors 951 and 953 of filter stages 941 and 943. A low pass filter 931 in circuit 902 may be coupled to the ADC 930 of circuit 902 and subtractors 952 and 954 of filter stages 942 and 944.

In some instances, circuits 901 and 902 may include a first mixer 928 coupled to its receiver 925 and its first ADC 930. The first mixer may mix the incoming radio frequency signal with an oscillating signal from an oscillating source 921. Circuits 901 and 902 may include a second mixer 912 coupled to its respective transmitter 915 and second ADC 914. The second mixer 912 may mix the outgoing signal with the oscillating signal from the oscillating source 921. Circuits 901 and 902 may include a radio frequency amplifier 926 and a first band pass filter 927 coupled between its respective receiver 925 and first mixer 928. Circuits 901 and 902 may include a second band pass filter 911 coupled to its respective transmitter 915 and second mixer 912. Circuits 901 and 902 may include a first low pass filter 929 coupled to its respective first mixer 928 and first ADC 930. Circuits 901 and 902 may include a second low pass filter 913 coupled to the second mixer 912 and the second ADC 914.

An alignment module 965 may be coupled between one or more filter stages 941 and the second ADC 914 in each circuit 901 and 902. The alignment module 965 may be configured to add a delay or otherwise time align the outgoing signal with the received incoming signal to cancel the transmitter noise from the corresponding received incoming signal.

In instances where the outgoing and incoming signals are channelized through respective channelizers or other circuits configured to split the signals on a channel by channel basis, each of the filter stages 941 to 944 and subtractors 951 to 954 may be provided for each of the channels. In some instances, the channelizers may include a DDC, a polyphase, a fast Fourier transform, and/or other type of transmultiplexer. Thus, if the signal band of the incoming signal contains n channels, there may be n copies of filter stage 941 and subtractor 951 for each of the n channels, n copies of filter stage 942 and subtractor 952 for each of the n channels, n copies of filter stage 943 and subtractor 953 for each of the n channels, and n copies of filter stage 944 and subtractor 954 for each of the n channels. Thus, variations of the cross coupled noise cancellation circuit may include the noise filter channelization arrangements shown in the other figures and discussed herein.

A multi transmitter-receiver noise cancellation circuit, such as that shown in FIG. 9, may in some instances include a number n of circuits similar to circuits 600, 700, 901 and/or 902, where n is two or more. Each of these circuits may include the same number n of cancellation filters for each active channel. Each of the filter stages of the n cancellation filters for each active channel may be coupled to a respective channel output of the second channelizer for the respective circuit. The subtractor of each cancellation filter for each active channel may be coupled to a respective channel output of the first channelizer for a respective circuit for each of the circuits from 1 to n.

A noise cancellation circuit in an embodiment may also include two or more receivers, each coupled to a respective analog to digital converter (ADC) and a respective channelizer. The noise cancellation circuit may also include two or more transmitters, each also coupled to a respective analog to digital converter (ADC) and a respective channelizer. The noise cancellation circuit may also include a plurality of cancellation filters with at least one cancellation filter coupled between each of the transmitter channelizers and the receiver channelizers.

Figure 10:
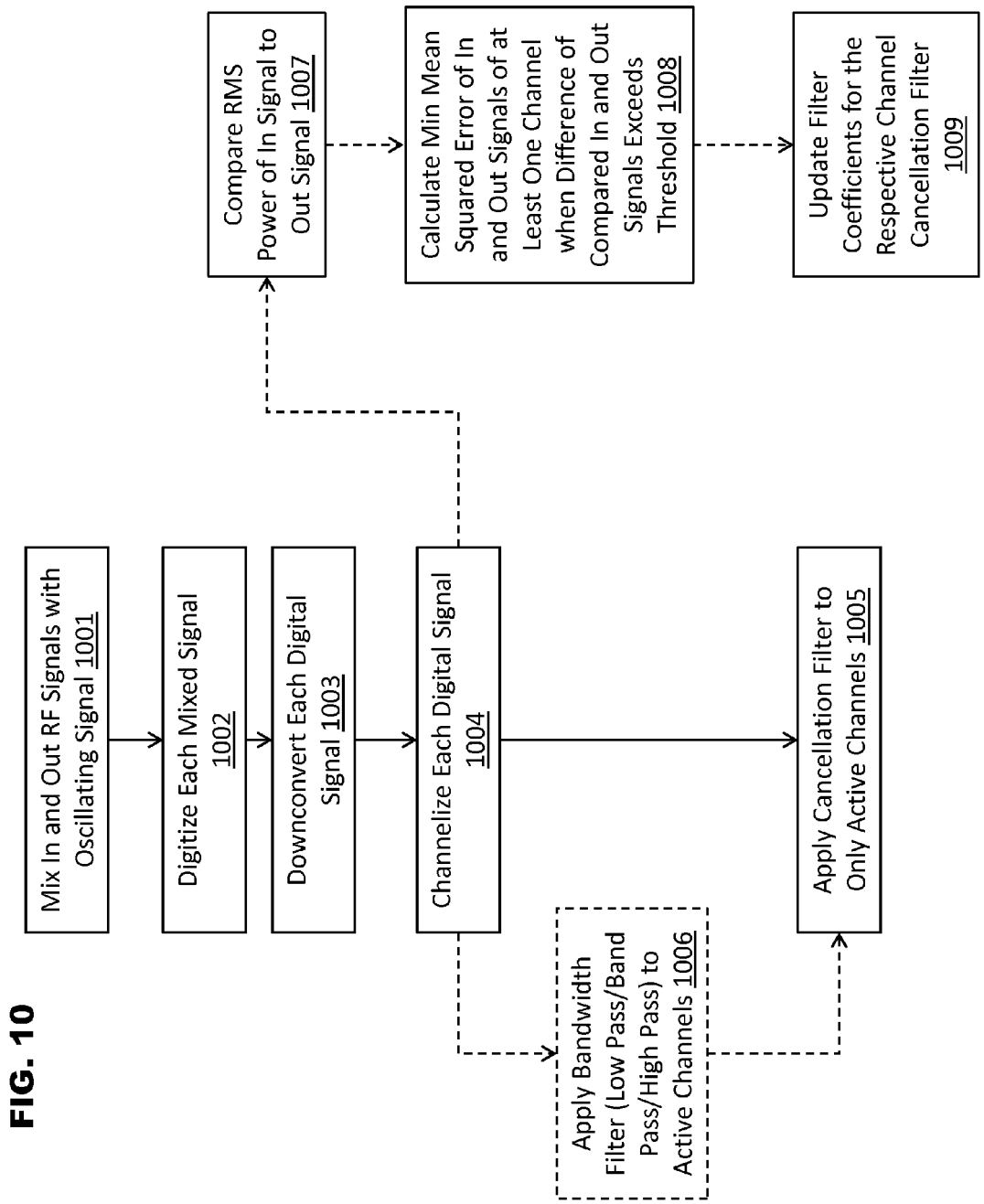
FIG. 10 shows exemplary methods in embodiments.

FIG. 10 shows an exemplary process in an embodiment. In box 1001, incoming received RF signals and outgoing RF transmission signals may be mixed with an oscillating signal.

In box 1002, each of the mixed signals may be digitized.

In box 1003, each of the digitized signals may be digitally down converted.

In box 1004, each of the digitized signals may be channelized or split on a channel by channel basis into respective channel components. The digitized signals may in some instances be channelized as part of a digital down conversion process.

In box 1005, a noise cancellation filter may be applied to only the identified active channels of the channelized down converted signals. A separate noise cancellation filter may be provided for each channel.

In box 1006, a channel filter may be applied to each of the channelized down converted signals before applying the noise cancellation filter. The channel filter may be a low pass filter, a band pass filter, or other filter.

In box 1007, a root mean square (RMS) power of the incoming signal may be compared to that of the outgoing signal.

In box 1008, a minimum mean square error of the channel filtered incoming and outgoing down converted signals may be calculated for each channel when a difference of the compared RMS power exceeds a threshold.

In box 1009, filter coefficients for the noise cancellation filter provided for at least one channel may be updated based on the calculated minimum mean square error.

Figure 11:
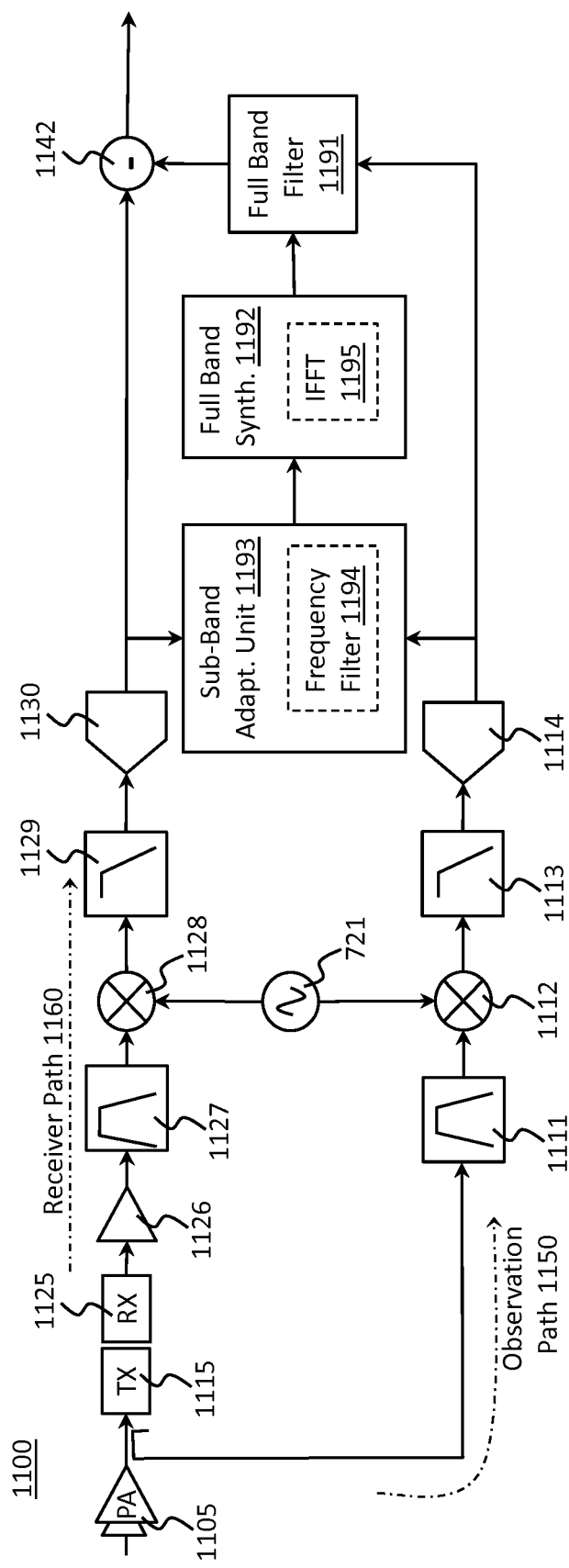
FIG. 11 shows an exemplary circuit in an embodiment.

FIG. 11 shows an embodiment 1100 in which filter coefficients of a full band filter 1191 are adapted on a sub-band basis. A transmitter 1115 may transmit outgoing RF signals. A receiver 1125 may receive incoming RF signals. The transmitter 1115 may be coupled to a RF power amplifier 1105 that may amplify outgoing signals to drive an antenna of the transmitter 1115. A first ADC 1130 may be coupled to the receiver 1125, a channel sub-band adaptation unit 1193, and a subtractor 1142. An incoming RF signal received at receiver 1125 may propagate along a receiver signal path 1160. A second ADC 1114 may be coupled to the transmitter 1115, the channel sub-band adaptation unit 1193, and full band noise cancellation filter 1191. The full band filter 1191 may be coupled to the subtractor 1142 and ADC 1114. The subtractor 1142 may subtract the estimated noise outputted by the full band filter 1191 from the digitized received incoming signal. An outgoing signal to be transmitted at transmitter 1115 may be propagated along observation path 1150 from the output of the power amplifier 1105 in addition to being transmitted at transmitted at transmitter 1115.

The channel sub-band adaptation unit 1193 may estimate filter coefficients on one or more of sub-bands of the received incoming signals. A sub-band may include any subdivision of a designated full signal band and may include one or more channels or subportions thereof. By estimating the filter coefficients on a sub-band basis, the estimates may need only be performed on activate channels or sub-bands. This avoids the need to estimate filter coefficients on inactive channels that may contain external blockers or signals from other sources appearing the designated signal band. The channel sub-band adaptation unit 1193 may therefore eliminate any influence of external blockers by limiting its analysis to only those active channels. This improves the accuracy and convergence times of the estimation process. A sub-band to full band synthesizer 1192 coupled to the adaptation unit 1193 may then reconstruct estimated filter coefficients for the full signal band from the individual estimates for each sub-band performed by the sub-band adaptation unit 1193.

In some instances, the channel sub-band adaptation unit 1193 may include a frequency domain adaptive filter 1194. A frequency domain adaptive filter 1194 may perform adaptation by estimating coefficients for each sub-band in a frequency domain. Different sub-bands may be assigned to different bins corresponding to particular frequency ranges. Bins for different sub-bands may be weighted differently according to the estimates for the respective sub-band. External blockers may be rejected by weighting the bins corresponding to frequency ranges of the external blockers accordingly.

The estimated coefficients for each sub-band may be based on a comparison of the digitized received incoming signal to the digitized outgoing signal transmitted at the transmitter 1115. To make this comparison, the sub-band adaptation unit 1193 may be coupled to both the ADC 1130 in the receiver path 1160 and then ADC 1114 in the observation path 1150. The estimated coefficients for the one or more sub-bands may then be used to independently adapt each respective sub-band. In some instances, this adaptation may occur in real time, but in other instances the estimation and adaptation may be delayed. In some instances the adaptation of one or more sub-bands may occur off-line during an interval when the receiver is not receiving any incoming signals or in non-real time.

The channel sub-band adaptation unit 1193 may use an estimation algorithm, such as a minimum mean square, least squares, recursive least squares, least mean squares, or other estimation algorithm. The filter coefficients may be estimated periodically at predetermined intervals or at other predetermined events, such as when the receiver 1125 and/or transmitter 1115 are offline, just starting up, or at other times. The estimator of the channel sub-band adaptation unit 1193 may generate updated filter coefficient estimates for each sub-band based on the estimate for the respective sub-band. The estimator may calculate the estimates for each sub-band serially one sub-band at a time or in parallel for two or more sub-bands at a time. The full band filter 1191 may have an asymmetric frequency response and complex filter coefficients since the outputs from ADC 1114 may be complex valued.

In some instances, the channel sub-band adaptation unit 1193 may include a comparator having logic for comparing a root mean square (RMS) power of the outgoing signal on the observation signal path 1150 and the incoming signal on the receiver signal path 1160. In some instances the comparator may compare the power of incoming signal on the receiver signal path 1160 to a predetermined maximum value or to the corresponding power of the outgoing signal. The comparator may also include logic for activating the estimator in the channel sub-band adaptation unit 1193 when the power of the incoming signal is less than the predetermined maximum value or when a difference of the compared power values of the incoming and outgoing signals exceeds a threshold. The activation of the estimator by the comparator may trigger the estimator to generate updated estimates for one or more channels or sub-bands of the received incoming signal.

A sub-band to full band synthesizer 1192 may be coupled to the sub-band adaptation unit 1193 and the full band filter 1191. The synthesizer 1192 may convert the estimated filter coefficients for each of the sub-bands into filter coefficients for the full band. Thus, the filter coefficients for the full band may be reconstituted from the individual coefficients calculated for each sub-band by the synthesizer 1192. Once all of the channels have been updated, the filter coefficients for the full band generated at the synthesizer 1192 may be used to set the filter coefficients in the full band filter 1191. This allows filter coefficients for the full band filter 1191 to be updated to improve noise cancellation independent of the digital front end so that user wanting to apply their own customized signal processing functions to incoming received signals can do so by connecting their own digital front end.

In instances where the sub-band adaptation unit 1193 included a frequency domain adaptive filter 1194, the synthesizer 1192 may include an inverse fast Fourier transform (IFFT) module 1195. The IFFT module 1195 may convert the estimated coefficients in the frequency domain for each bin corresponding to an active sub-band into a set of filter coefficients for the full signal band in the time domain. Using the frequency domain adaptive filter 1194 and the IFFT module 1195 may reduce the complexity of calculations that are required to reconstitute the full band filter coefficients by preserving orthogonality between the different sub-bands.

In some instances, a first mixer 1128 may be coupled to the receiver 1125 and the first ADC 1130. The first mixer may mix the incoming radio frequency signal with an oscillating signal from an oscillating source 1121. A second mixer 1112 may be coupled to the transmitter 1115 and the second ADC 1114. The second mixer 1112 may mix the outgoing signal with the oscillating signal from the oscillating source 1121. A radio frequency amplifier 1126 and a first band pass filter 1127 may be coupled between the receiver 1125 and the first mixer 1128. A second band pass filter 1111 coupled to the transmitter 1115 and the second mixer 1112. A first low pass filter 1129 may be coupled to the first mixer 1128 and the first ADC 1130. A second low pass filter 1113 may be coupled to the second mixer 1112 and the second ADC 1114.

Figure 12:
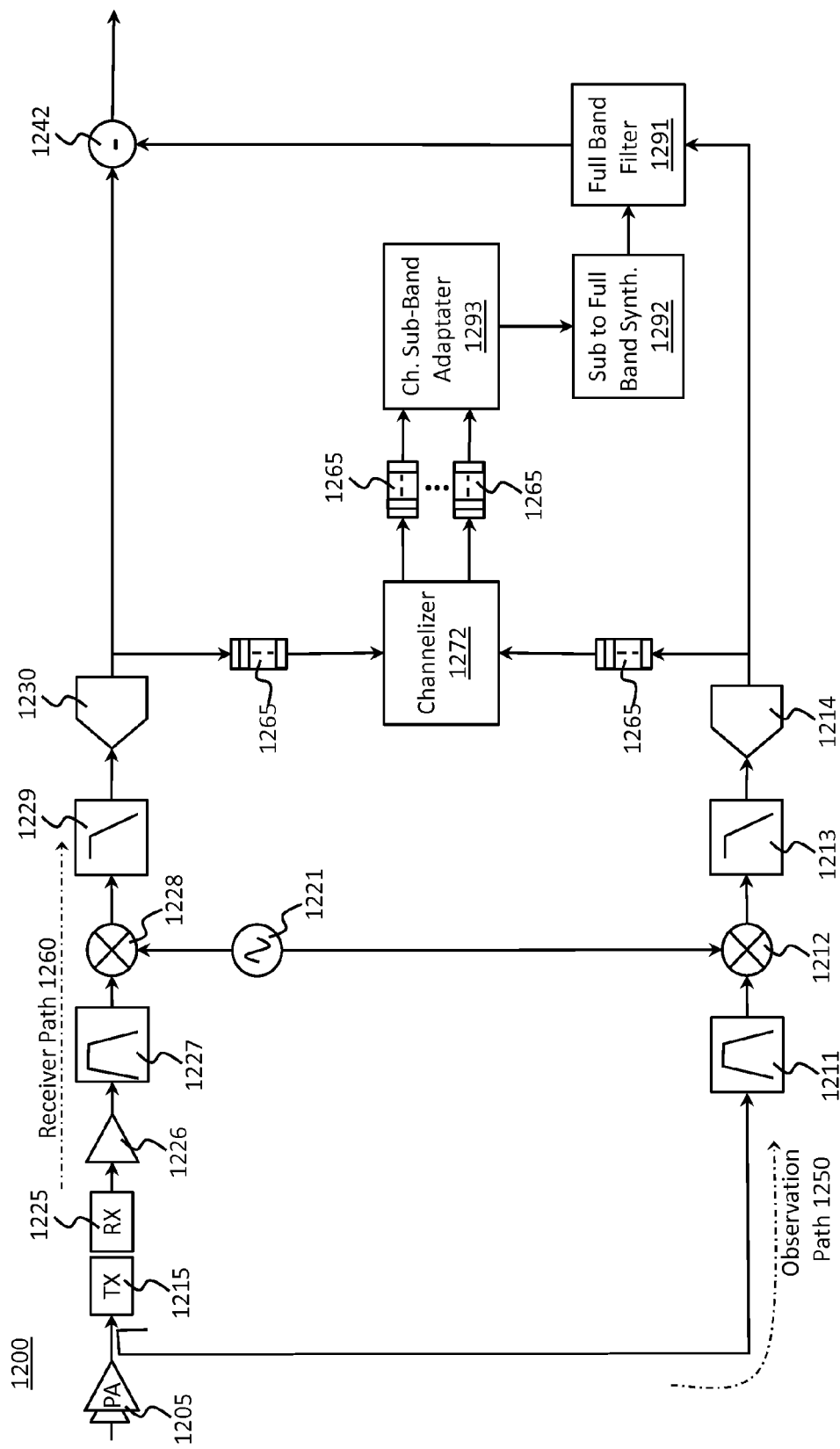
FIG. 12 shows an exemplary circuit in an embodiment.

FIG. 12 shows an embodiment 1200 in which filter coefficients of a full band filter 1291 are adapted on a sub-band basis. A transmitter 1215 may transmit outgoing RF signals. A receiver 1225 may receive incoming RF signals. The transmitter 1215 may be coupled to a RF power amplifier 1205 that may amplify outgoing signals to drive an antenna of the transmitter 1215. A first ADC 1230 may be coupled to the receiver 1225, a channelizer 1272, and a subtractor 1242. An incoming RF signal received at receiver 1225 may propagate along a receiver signal path 1260. A second ADC 1214 may be coupled to the transmitter 1215, channelizer 1272, and full band noise cancellation filter 1291. The full band filter 1291 may be coupled to subtractor 1242 and ADC 1214. The subtractor 1242 may subtract the estimated noise outputted by the full band filter 1291 from the digitized received incoming signal. An outgoing signal to be transmitted at transmitter 1215 may be propagated along observation path 1250 from the output of the power amplifier 1205 in addition to being transmitted at transmitted at transmitter 1215.

The channelizer 1272 may down convert and/or channelize the signals outputted by the respective ADC 1214 and 1230. During the channelizing, the channelizer 1272 may split the respective signals into separate sub-bands, which may, but need not, include one or more channels. In some instances, the channelizer 1272 may include a separate output for each designated sub-band within an incoming RF signal band. In some instances, the channelizer 1272 may only output signals on a sub-band by sub-band basis for those sub-bands that are active. The signals for each sub-band may outputted serially, one sub-band at a time, or in parallel. In instances where the signals for each sub-band are outputted by the channelizer 1272 serially, the channelizer 1272 may include a serialized digital downconverter and channel core filter. The channelizer 1272 need not generate output signals for inactive channels. In some instances, the channelizer 1272 may include a DDC, a polyphase, a fast Fourier transform, and/or other type of transmultiplexer.

In some instances, one or more buffers 1265 may be coupled to the inputs and/or outputs of the channelizer 1272. Buffers 1265 may temporarily store copies of the digitized signals on the receiver signal path 1260 and observation signal path 1250 that are supplied as inputs to the channelizer 1272. Buffers 1265 may also temporarily stores copies of channelized signals outputted by the channelizer 1272 that are subsequently used as inputs to the channel sub-band adapter 1293 coupled to the channelizer 1272 and/or buffers 1265. Buffers 1265 may be used in instances where the channelizer 872 operates serially in that the channelizer 1272 is configured to output a signal for one sub-band at a time. The buffers 1265 may also include an alignment module that may be configured to add a delay or otherwise time align a buffered signal originating from receiver signal path 1260 with a corresponding buffered signal originating from the observation signal path 1250. The alignment module may then time align serial signals outputted by the channelizer 1272 at different times even though the signals may correspond to each other for noise cancellation purposes.

The channelizer 1272 and/or buffers 1265 may be coupled to a channel sub-band adaptation unit 1293. The channel sub-band adaptation unit 1293 may estimate filter coefficients of a noise cancellation filter on each of the sub-bands of the received incoming signals outputted by the channelizer 1272. A sub-band may include any subdivision of a designated full signal band and may include one or more channels or subportions thereof. By estimating the filter coefficients on a sub-band basis, the estimation calculation may be performed on only those activate channels or sub-bands. This avoids the need to analyze inactive channels that may contain external blockers or signals from other sources appearing the designated signal band. The channel sub-band adaptation unit 1293 may therefore eliminate any influence of external blockers by analyzing only active channels. This improves the accuracy and convergence times of filter coefficient generation process for the full band noise cancellation filter. A sub-band to full band synthesizer 1292 coupled to the sub-band adaptation unit 1293 may then reconstruct estimated filter coefficients for the full signal band by reconstituting the full band coefficients from the individual estimated filter coefficients of each sub-band performed by the sub-band adaptation unit 1293.

In some instances, the channel sub-band adaptation unit 1293 may include a frequency domain adaptive filter 1194. A frequency domain adaptive filter 1194 may perform adaptation by estimate filter coefficients for each sub-band in a frequency domain. Different sub-bands may be assigned to different bins corresponding to particular frequency ranges. Bins for different sub-bands may be weighted differently according to the estimates for the respective sub-band. External blockers may be rejected by weighting the bins corresponding to frequency ranges of the external blockers accordingly.

The estimated filter coefficients for each sub-band may be based on a comparison of the digitized received incoming signal to the digitized outgoing signal transmitted at the transmitter 1215. To make this comparison, the sub-band adaptation unit 1293 may be coupled to both the ADC 1230 in the receiver path 1260 and then ADC 1214 in the observation path 1250 via channelizer 1272. The estimates for the one or more sub-bands may then be used to generate filter coefficients that independently adapt each respective sub-band. In some instances, this adaptation may occur in real time, but in other instances the estimation and adaptation may be delayed. In some instances the adaptation of one or more sub-bands may occur off-line during an interval when the receiver is not receiving any incoming signals or in non-real time.

The channel sub-band adaptation unit 1293 may use an estimation algorithm, such as a minimum mean square, least squares, recursive least squares, least mean squares, or other estimation algorithm to estimate the filter coefficients. The coefficients may be estimated periodically at predetermined intervals or at other predetermined events, such as when the receiver 1225 and/or transmitter 1215 are offline, just starting up, or at other times. The estimator of the channel sub-band adaptation unit 1293 may generate updated filter coefficients for each sub-band based on the estimates for the respective sub-band. The estimator may calculate the estimates for each sub-band serially one sub-band at a time or in parallel for two or more sub-bands at a time. The full band filter 1291 may have an asymmetric frequency response and complex filter coefficients since the outputs from ADC 1214 may be complex valued.

In some instances, the channel sub-band adaptation unit 1293 may include a comparator having logic for comparing a root mean square (RMS) power of the outgoing signal on the observation signal path 1250 and the incoming signal on the receiver signal path 1260. In some instances the comparator may compare the power of incoming signal on the receiver signal path 1260 to a predetermined maximum value or to the corresponding power of the outgoing signal. The comparator may also include logic for activating the estimator in the channel sub-band adaptation unit 1293 when the power of the incoming signal is less than the predetermined maximum value or when a difference of the compared power values of the incoming and outgoing signals exceeds a threshold. The activation of the estimator by the comparator may trigger the estimator to generate updated filter coefficient estimates for one or more channels or sub-bands of the received incoming signal.

A sub-band to full band synthesizer 1292 may be coupled to the sub-band adaptation unit 1293 and the full band filter 1291. The synthesizer 1292 may convert the filter coefficient estimates for each of the sub-bands into estimated coefficients for the full band. Thus, the estimated coefficients for the full band may be reconstituted from the individual coefficients calculated for each sub-band by the synthesizer 1292. Once all of the channels have been updated, the generated coefficients for the full band may be used to set the filter coefficients in the full band filter 1291. This allows filter coefficients for the full band filter 1291 to be updated to improve noise cancellation independent of the digital front end so that user wanting to apply their own customized signal processing functions to incoming received signals can do so by connecting their own digital front end.

In instances where the sub-band adaptation unit 1293 includes a frequency domain adaptive filter 1194, the synthesizer 1292 may include an inverse fast Fourier transform (IFFT) module 1195. The IFFT module 1195 may converted the estimated coefficients in the frequency domain for each bin corresponding to an active sub-band into coefficients for the full signal band in the time domain. Using the frequency domain adaptive filter 1194 and the IFFT module 1195 may reduce the complexity of calculations that are required to reconstitute the full band filter coefficients by preserving orthogonality between the different sub-bands.

In some instances, a first mixer 1228 may be coupled to the receiver 1225 and the first ADC 1230. The first mixer may mix the incoming radio frequency signal with an oscillating signal from an oscillating source 1221. A second mixer 1212 may be coupled to the transmitter 1215 and the second ADC 1214. The second mixer 1212 may mix the outgoing signal with the oscillating signal from the oscillating source 1221. A radio frequency amplifier 1226 and a first band pass filter 1227 may be coupled between the receiver 1225 and the first mixer 1228. A second band pass filter 1211 coupled to the transmitter 1215 and the second mixer 1212. A first low pass filter 1229 may be coupled to the first mixer 1228 and the first ADC 1230. A second low pass filter 1213 may be coupled to the second mixer 1212 and the second ADC 1214.

The foregoing description has been presented for purposes of illustration and description. It is not exhaustive and does not limit embodiments to the precise forms disclosed. Modifications and variations are possible in light of the above teachings or may be acquired from the practicing embodiments consistent with those described herein. For example, in some embodiments the channelization of the incoming and outgoing signals may be performed by the digital down converter but in other instances the channelization may be performed independent of the down conversion. Additionally, in some embodiments the transmitter and the receiver may be independent from each other with their own antennas but in other embodiments the transmitter and receiver may be part of a transceiver and/or coupled to a single antenna through a duplexer. Finally, in some instances the bandwidths of each channel may be based on those specified by a particular communications standard, but in other instances the channelization may be applied on a customized sub band basis independent of any channel bandwidth dictated by the communications standard. For example, while the third generation cellular W-CDMA standard divides the band up into 5 MHz channels, depending on the duplexer complexity, the presence of external blockers, or other criteria noise filter cancellation may be applied on a channelized sub band basis different from the 5 MHz channels dictated by this standard.

We claim:

1. A device comprising:
   a plurality of transmitter outputs;
   a plurality of receivers;
   an observation receiver configured to be selectively coupled to one of the plurality of transmitter outputs and to estimate transmission noise from the coupled transmitter output;
   a selector device to select which transmitter output of the plurality transmitter outputs to selectively couple to the observation receiver based on monitored system conditions; and
   a cancellation filter, coupled to the observation receiver, to cancel the estimated transmission noise in at least one of the plurality of receivers.

2. The device of claim 1, further comprising a switching device to selectively couple the observation receiver to one of the plurality of transmitter outputs.

3. The device of claim 1, wherein the system conditions include transmit power levels of the transmitter outputs.

4. The device of claim 1, wherein the system conditions include sensitivity levels of the receivers.

5. The device of claim 1, wherein the selector device includes an input couple to a baseband processor for receiving the system conditions.

6. The device of claim 1, wherein the system conditions include an estimate leakage between transmitter-receiver paths.

7. The device of claim 1, further comprising an estimator, coupled to the selector device, to estimate leakage between transmitter-receiver paths based on inputs from the receiver paths and observation receiver.

8. A method, performed by a device, comprising:
   transmitting a plurality of RF outgoing signals;
   monitoring communication conditions;
   based on the monitored communication conditions, selecting a subset of the plurality of RF outgoing signals;
   converting incoming RF signals and the subset of the plurality of RF outgoing signals to digitized baseband signals;
   generating noise cancellation signal(s) based on the converted subset of the plurality of RF outgoing signals; and
   applying the noise cancellation signal(s) to select converted incoming signal(s) of the converted incoming signal(s).

9. The method of claim 8, wherein the communication conditions include transmit power levels of the outgoing signals.

10. The method of claim 8, wherein the communication conditions include sensitivity levels of the incoming signals.

11. The method of claim 8, wherein the communication conditions include an estimate leakage between transmitter-receiver paths.

12. The method of claim 8, wherein converting includes mixing the incoming RF signals and the subset of the plurality of RF outgoing signals with respective oscillation signals.

13. A circuit, comprising:
   an observation receiver, selectively coupled by a switching system, to one of a plurality of transmitter paths of multi transmitter-receiver system, the observation receiver including circuitry to convert the selected outgoing RF signal to a baseband digital signal;
   a selector to control the switching system for selecting which transmitter path the observation receiver is coupled to based on monitored conditions of the multi transmitter-receiver system;
   a filter to generate a noise cancellation signal based on the baseband digital signal; and
   a combiner to apply the noise cancellation signal to a receiver path in the multi transmitter-receiver system.

14. The circuit of claim 13, wherein the monitored conditions include transmit power levels.

15. The circuit of claim 13, wherein the monitored conditions include sensitivity levels of incoming signals.

16. The circuit of claim 13, wherein the monitored conditions include an estimate leakage between transmitter-receiver paths.

17. The circuit of claim 13, wherein the filter includes coefficients that are adjusted based on the baseband digital signal.

18. The circuit of claim 13, wherein the circuitry includes a mixer to mix the outgoing RF signal with an oscillation signal and an analog-to-digital converter to convert the mixed signal to the baseband digital signal.

* * * * *